US010168809B2

(12) United States Patent
Hirakata et al.

(10) Patent No.: US 10,168,809 B2
(45) Date of Patent: Jan. 1, 2019

(54) TOUCH PANEL

(71) Applicant: Semiconductor Energy Laboratory Co., Ltd., Atsugi-shi, Kanagawa-ken (JP)

(72) Inventors: Yoshiharu Hirakata, Kanagawa (JP); Daisuke Kubota, Kanagawa (JP); Kenichi Okazaki, Tochigi (JP); Shunpei Yamazaki, Tokyo (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 10 days.

(21) Appl. No.: 15/066,026

(22) Filed: Mar. 10, 2016

(65) Prior Publication Data

US 2016/0274398 A1    Sep. 22, 2016

(30) Foreign Application Priority Data

Mar. 17, 2015    (JP) .................................. 2015-053661
Mar. 17, 2015    (JP) .................................. 2015-053765

(51) Int. Cl.
*G02F 1/1333*    (2006.01)
*G06F 3/041*    (2006.01)
*G06F 3/044*    (2006.01)

(52) U.S. Cl.
CPC ............ *G06F 3/0412* (2013.01); *G06F 3/044* (2013.01); *G06F 3/0416* (2013.01); *G06F 2203/04107* (2013.01); *G06F 2203/04111* (2013.01); *G06F 2203/04112* (2013.01)

(58) Field of Classification Search
CPC ............................ G06F 3/0412; G06F 3/0416
See application file for complete search history.

(56) References Cited

U.S. PATENT DOCUMENTS

| 5,731,856 | A  | 3/1998 | Kim et al.      |
|-----------|----|--------|-----------------|
| 5,744,864 | A  | 4/1998 | Cillessen et al.|
| 6,294,274 | B1 | 9/2001 | Kawazoe et al.  |
| 6,563,174 | B2 | 5/2003 | Kawasaki et al. |

(Continued)

FOREIGN PATENT DOCUMENTS

| CN | 101630214 A | 1/2010 |
|----|-------------|--------|
| CN | 103677399 A | 3/2014 |

(Continued)

OTHER PUBLICATIONS

International Search Report (Application No. PCT/IB2016/051214) dated Jun. 21, 2016.

(Continued)

*Primary Examiner* — Sang V Nguyen
(74) *Attorney, Agent, or Firm* — Fish & Richardson P.C.

(57) ABSTRACT

To provide a thin touch panel, a touch panel with high visibility, a lightweight touch panel, or a touch panel with low power consumption. A pair of conductive layers included in a capacitive touch sensor have a mesh shape including a plurality of openings. Furthermore, the pair of conductive layers included in the touch sensor are provided between a pair of substrates included in the touch panel, and a light-transmitting conductive layer capable of supplying a constant potential is provided between a circuit which drives a display element and the pair of conductive layers.

20 Claims, 26 Drawing Sheets

(56) References Cited

U.S. PATENT DOCUMENTS

| | | |
|---|---|---|
| 6,727,522 B1 | 4/2004 | Kawasaki et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,211,825 B2 | 5/2007 | Shih et al. |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,732,819 B2 | 6/2010 | Akimoto et al. |
| 8,243,027 B2 | 8/2012 | Hotelling |
| 8,994,669 B2 | 3/2015 | Chang |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1* | 12/2006 | Ishii ............... H01L 29/7869 257/43 |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006833 A1* | 1/2008 | Hirakata ............... F21V 9/14 257/79 |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0013799 A1* | 1/2010 | Kim ............... G06F 3/0433 345/177 |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2011/0032207 A1 | 2/2011 | Huang et al. |
| 2011/0084267 A1* | 4/2011 | Yamazaki ............ H01L 27/1225 257/43 |
| 2011/0169783 A1* | 7/2011 | Wang ............... G06F 3/0412 345/176 |
| 2011/0242027 A1* | 10/2011 | Chang ............... G06F 3/0412 345/173 |
| 2012/0032193 A1* | 2/2012 | Kurokawa ........ H01L 27/14632 257/84 |
| 2013/0082254 A1* | 4/2013 | Yamazaki ............... H01L 29/20 257/43 |
| 2013/0140554 A1* | 6/2013 | Yamazaki ............. H01L 29/786 257/43 |
| 2013/0293096 A1* | 11/2013 | Kang ............... H01H 1/10 313/511 |
| 2014/0061654 A1* | 3/2014 | Yamazaki ............ H01L 27/1225 257/59 |
| 2014/0070350 A1* | 3/2014 | Kim ............... G06F 3/044 257/432 |
| 2014/0078104 A1* | 3/2014 | Lee ............... G06F 3/044 345/174 |
| 2014/0176821 A1* | 6/2014 | Chae ............... G06F 3/041 349/12 |
| 2014/0198268 A1* | 7/2014 | Sugita ............... G06F 3/044 349/12 |
| 2014/0232950 A1* | 8/2014 | Park ............... G06F 3/044 349/12 |
| 2014/0285732 A1 | 9/2014 | Tanabe et al. |
| 2014/0362324 A1* | 12/2014 | Yamazaki ......... G02F 1/136213 349/47 |
| 2015/0144920 A1 | 5/2015 | Yamazaki et al. |
| 2015/0255518 A1 | 9/2015 | Watanabe et al. |
| 2015/0310793 A1 | 10/2015 | Kawashima et al. |
| 2015/0349041 A1 | 12/2015 | Miyake |

FOREIGN PATENT DOCUMENTS

| | | |
|---|---|---|
| EP | 1737044 A | 12/2006 |
| EP | 2226847 A | 9/2010 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |

(56) References Cited

FOREIGN PATENT DOCUMENTS

| | | |
|---|---|---|
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2007/096055 | 4/2007 |
| JP | 2007/123861 | 5/2007 |
| JP | 2010-027052 A | 2/2010 |
| JP | 2012-256812 A | 12/2012 |
| JP | 2014-056564 A | 3/2014 |
| JP | 2014-123371 A | 7/2014 |
| KR | 2010-0009461 A | 1/2010 |
| KR | 2014-0034979 A | 3/2014 |
| KR | 2014-0080038 A | 6/2014 |
| WO | WO-2004/114391 | 12/2004 |

OTHER PUBLICATIONS

Written Opinion (Application No. PCT/IB2016/051214) dated Jun. 21, 2016.
Asakuma. N. et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.
Asaoka. Y et al., "29.1:Polarizer-Free Reflective LCD Combined With Ultra Low-Power Driving Technology", SID Digest '09 : SID International Symposium Digest of Technical Papers, May 31, 2009, pp. 395-398.
Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.
Cho.D et al., "21.2:Al and Sn-Doped Zinc Indium Oxide Thin Film Transistors for AMOLED Back-Plane", SID Digest '09 : SID International Symposium Digest of Technical Papers, May 31, 2009, pp. 280-283.
Clark.S et al., "First Principles Methods Using Castep", Zeitschrift fur Kristallographie, 2005, vol. 220, pp. 567-570.
Coates.D et al., "Optical Studies of the Amorphous Liquid-Cholesteric Liquid Crystal Transistion: The "Blue Phase"", Physics Letters, Sep. 10, 1973, vol. 45A, No. 2, pp. 115-116.
Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.
Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.
Fortunato.E et al., "Wide-Bandgap High-Mobility ZnO Thin-Film Transistors Produced at Room Temperature", Appl. Phys. Lett. (Applied Physics Letters) , Sep. 27, 2004, vol. 85, No. 13, pp. 2541-2543.
Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.
Godo.H et al., "P-9:Numerical Analysis on Temperature Dependence of Characteristics of Amorphous In—Ga—Zn-Oxide TF", SID Digest '09 : SID International Symposium Digest of Technical Papers, May 31, 2009, pp. 1110-1112.
Godo.H et al., "Temperature Dependence of Characteristics and Electronic Structure for Amorphous In—Ga—Zn-Oxide TFT", AM-FPD '09 Digest of Technical Papers, Jul. 1, 2009, pp. 41-44.
Hayashi.R et al., "42.1: Invited Paper: Improved Amorphous In—Ga—Zn—O TFTs", SID Digest '08 : SID International Symposium Digest of Technical Papers, May 20, 2008, vol. 39, pp. 621-624.
Hirao.T et al., "Novel Top-Gate Zinc Oxide Thin-Film Transistors (ZNO TFTs) for AMLCDs", J. Soc. Inf. Display (Journal of the Society for Information Display), 2007, vol. 15, No. 1, pp. 17-22.
Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.
Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.
Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.
Ikeda.T et al., "Full-Functional System Liquid Crystal Display Using CG-Silicon Technology", SID Digest '04 : SID International Symposium Digest of Technical Papers, 2004, vol. 35, pp. 860-863.
Janotti.A et al., "Native Point Defects in ZnO", Phys. Rev. B (Physical Review. B), Oct. 4, 2007, vol. 76, No. 16, pp. 165202-1-165202-22.
Janotti.A et al., "Oxygen Vacancies in ZnO", Appl. Phys. Lett. (Applied Physics Letters) , 2005, vol. 87, pp. 122102-1-122102-3.
Jeong.J et al., "3.1: Distinguished Paper: 12.1-Inch WXGA AMOLED Display Driven by Indium-Gallium-Zinc Oxide TFTs Array", SID Digest '08 : SID International Symposium Digest of Technical Papers, May 20, 2008, vol. 39, No. 1, pp. 1-4.
Jin.D et al., "65.2:Distinguished Paper:World-Largest (6.5") Flexible Full Color Top Emission AMOLED Display on Plastic Film and its Bending Properties", SID Digest '09 : SID International Symposium Digest of Technical Papers, May 31, 2009, pp. 983-985.
Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.
Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.
Kikuchi.H et al., "62.2:Invited Paper:Fast Electro-Optical Switching in Polymer-Stabilized Liquid Crysyalline Blue Phases for Display Application", SID Digest '07 : SID International Symposium Digest of Technical Papers, 2007, vol. 38, pp. 1737-1740.
Kikuchi.H et al., "Polymer-Stabilized Liquid Crystal Blue Phases", Nature Materials, Sep. 2, 2002, vol. 1, pp. 64-68.
Kim.S et al., "High-Performance oxide thin film transistors passivated by various gas plasmas", 214th ECS Meeting, 2008, No. 2317, ECS.
Kimizuka.N et al., "Spinel,YbFe2O4, and Yb2Fe3O7 Types of Structures for Compounds in the In2O3 and Sc2O3—A2O3—Bo Systems [A; Fe, Ga, or Al; B: Mg, Mn, Fe, Ni, Cu,or Zn] at Temperatures over 1000° C.", Journal of Solid State Chemistry, 1985, vol. 60, pp. 382-384.
Kimizuka.N et al., "Syntheses and Single-Crystal Data of Homologous Compounds, In2O3(ZnO)m (m = 3, 4, and 5), InGaO3(ZnO)3, and Ga2O3(ZnO)m (m =7, 8, 9, and 16) in the In2O3—ZnGa2O4—ZnO System", Journal of Solid State Chemistry, Apr. 1, 1995, vol. 116, No. 1, pp. 170-178.
Kitzerow.H et al., "Observation of Blue Phases in Chiral Networks", Liquid Crystals, 1993, vol. 14, No. 3, pp. 911-916.
Kurokawa.Y et al., "UHF RFCPUS on Flexible and Glass Substrates for Secure RFID Systems", Journal of Solid-State Circuits , 2008, vol. 43, No. 1, pp. 292-299.
Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.
Lee.H et al., "Current Status of, Challenges to, and Perspective View of AM-OLED ", IDW '06 : Proceedings of the 13th International Display Workshops, Dec. 7, 2006, pp. 663-666.
Lee.J et al., "World'S Largest (15-Inch) XGA AMLCD Panel Using IGZO Oxide TFT", SID Digest '08 : SID International Symposium Digest of Technical Papers, May 20, 2008, vol. 39, pp. 625-628.
Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.

(56) References Cited

OTHER PUBLICATIONS

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Masuda.S et al., "Transparent thin film transistors using ZnO as an active channel layer and their electrical properties", J. Appl. Phys. (Journal of Applied Physics), Feb. 1, 2003, vol. 93, No. 3, pp. 1624-1630.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Miyasaka.M, "Suftla Flexible Microelectronics on Their Way to Business", SID Digest '07 : SID International Symposium Digest of Technical Papers, 2007, vol. 38, pp. 1673-1676.

Mo.Y et al., "Amorphous Oxide TFT Backplanes for Large Size AMOLED Displays", IDW '08 : Proceedings of the 6th International Display Workshops, Dec. 3, 2008, pp. 581-584.

Nakamura.M et al., "The phase relations in the In2O3—Ga2ZnO4—ZnO system at 1350° C.", Journal of Solid State Chemistry, Aug. 1, 1991, vol. 93, No. 2, pp. 298-315.

Nakamura.M, "Synthesis of Homologous Compound with New Long-Period Structure", NIRIM Newsletter, Mar. 1, 1995, vol. 150, pp. 1-4.

Nomura.K et al., "Amorphous Oxide Semiconductors for High-Performance Flexible Thin-Film Transistors", Jpn. J. Appl. Phys. (Japanese Journal of Applied Physics), 2006, vol. 45, No. 5B, pp. 4303-4308.

Nomura.K et al., "Carrier transport in transparent oxide semiconductor with intrinsic structural randomness probed using single-crystaline InGaO3(ZnO)5 films", Appl. Phys. Lett. (Applied Physics Letters), Sep. 13, 2004, vol. 85, No. 11, pp. 1993-1995.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Nomura.K et al., "Thin-Film Transistor Fabricated in Single-Crystalline Transparent Oxide Semiconductor", Science, May 23, 2003, vol. 300, No. 5623, pp. 1269-1272.

Nowatari.H et al., "60.2: Intermediate Connector With Suppressed Voltage Loss for White Tandem OLEDs", SID Digest '09 : SID International Symposium Digest of Technical Papers, May 31, 2009, vol. 40, pp. 899-902.

Oba.F et al., "Defect energetics in ZnO: A hybrid Hartree-Fock density functional study", Phys. Rev. B (Physical Review. B), 2008, vol. 77, pp. 245202-1-245202-6.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

OHara.H et al., "21.3:4.0 In. QVGA AMOLED Display Using In—Ga—Zn-Oxide TFTs with a Novel Passivation Layer", SID Digest '09 : SID International Symposium Digest of Technical Papers, May 31, 2009, pp. 284-287.

Ohara.H et al., "Amorphous In—Ga—Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Orita.M et al., "Amorphous transparent conductive oxide InGaO3(ZnO)m (m<4):a Zn4s conductor", Philosophical Magazine, 2001, vol. 81, No. 5, pp. 501-515.

Orita.M et al., "Mechanism of Electrical Conductivity of Transparent InGaZnO4", Phys. Rev. B (Physical Review. B), Jan. 15, 2000, vol. 61, No. 3, pp. 1811-1816.

Osada.T et al., "15.2: Development of Driver-Integrated Panel using Amorphous In—Ga—Zn-Oxide TFT", SID Digest '09 : SID International Symposium Digest of Technical Papers, May 31, 2009, pp. 184-187.

Osada.T et al., "Development of Driver-Integrated Panel Using Amorphous In—Ga—Zn-Oxide TFT", AM-FPD '09 Digest of Technical Papers, Jul. 1, 2009, pp. 33-36.

Park.J et al., "Amorphous Indium-Gallium-Zinc Oxide TFTs and Their Application for Large Size AMOLED", AM-FPD '08 Digest of Technical Papers, Jul. 2, 2008, pp. 275-278.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Park.J et al., "Electronic Transport Properties of Amorphous Indium-Gallium-Zinc Oxide Semiconductor upon Exposure to Water", Appl. Phys. Lett. (Applied Physics Letters), 2008, vol. 92, pp. 072104-1-072104-3.

Park.J et al., "High performance amorphous oxide thin film transistors with self-aligned top-gate structure", IEDM 09: Technical Digest of International Electron Devices Meeting, Dec. 7, 2009, pp. 191-194.

Park.J et al., "Improvements in the Device Characteristics of Amorphous Indium Gallium Zinc Oxide Thin-Film Transistors by Ar Plasma Treatment", Appl. Phys. Lett. (Applied Physics Letters), Jun. 26, 2007, vol. 90, No. 26, pp. 262106-1-262106-3.

Park.S et al., "Challenge to Future Displays: Transparent AM-OLED Driven by Peald Grown ZnO TFT", IMID '07 Digest, 2007, pp. 1249-1252.

Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.

Prins.M et al., "A Ferroelectric Transparent Thin-Film Transistor", Appl. Phys. Lett. (Applied Physics Letters), Jun. 17, 1996, vol. 68, No. 25, pp. 3650-3652.

Sakata.J et al., "Development of 4.0-In. AMOLED Display With Driver Circuit Using Amorphous In—Ga—Zn-Oxide TFTs", IDW '09 : Proceedings of the 16th International Display Workshops, 2009, pp. 689-692.

Son.K et al., "42.4L: Late-News Paper: 4 Inch QVGA AMOLED Driven by the Threshold Voltage Controlled Amorphous GIZO (Ga2O3—In2O3—ZnO) TFT"SID Digest '08 : SID International Symposium Digest of Technical Papers, May 20, 2008, vol. 39, pp. 633-636.

Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.

Tsuda.K et al., "Ultra Low Power Consumption Technologies for Mobile TFT-LCDs ", IDW '02 : Proceedings of the 9th International Display Workshops, Dec. 4, 2002, pp. 295-298.

Ueno.K et al., "Field-Effect Transistor on SrTiO3 With Sputtered Al2O3 Gate Insulator", Appl. Phys. Lett. (Applied Physics Letters), Sep. 1, 2003, vol. 83, No. 9, pp. 1755-1757.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

\* cited by examiner writing period 3510
3511 sensing period 3510
3511

TOUCH PANEL

TECHNICAL FIELD

One embodiment of the present invention relates to an input device. One embodiment of the present invention relates to a display device. One embodiment of the present invention relates to an input/output device. One embodiment of the present invention relates to a touch panel.

Note that one embodiment of the present invention is not limited to the above technical field. Examples of the technical field of one embodiment of the present invention disclosed in this specification and the like include a semiconductor device, a display device, a light-emitting device, a power storage device, a memory device, an electronic device, a lighting device, an input device, an input/output device, a driving method thereof, and a manufacturing method thereof.

In this specification and the like, a semiconductor device generally means a device that can function by utilizing semiconductor characteristics. A semiconductor element such as a transistor, a semiconductor circuit, an arithmetic device, and a memory device are each an embodiment of a semiconductor device. An imaging device, a display device, a liquid crystal display device, a light-emitting device, an input device, an input/output device, an electro-optical device, a power generation device (including a thin film solar cell, an organic thin film solar cell, and the like), and an electronic device may each include a semiconductor device.

BACKGROUND ART

In recent years, a display device provided with a touch sensor as a position-input device has been in practical use. A display device provided with a touch sensor is called a touch panel, a touch screen, or the like (hereinafter also referred to simply as a touch panel). For example, a smartphone and a tablet terminal are examples of a portable information terminal provided with a touch panel.

As one of display devices, there is a liquid crystal display device provided with a liquid crystal element. For example, an active matrix liquid crystal display device, in which pixel electrodes are arranged in a matrix and transistors are used as switching elements connected to respective pixel electrodes, has attracted attention.

For example, an active matrix liquid crystal display device including transistors, in which metal oxide is used for a channel formation region, as switching elements connected to respective pixel electrodes is already known (Patent Documents 1 and 2).

It is known that a liquid crystal display device is classified into two major types: transmissive type and reflective type.

In a transmissive liquid crystal display device, a backlight such as a cold cathode fluorescent lamp or an LED is used, and a state in which light from the backlight is transmitted through liquid crystal and output to the outside of the liquid crystal display device or a state in which light is not output is selected using optical modulation action of liquid crystal, whereby bright and dark images are displayed. Furthermore, those displays are combined to display an image.

In a reflective liquid crystal display device, a state in which external light, in other words, incident light is reflected at a pixel electrode and output to the outside of the device or a state in which incident light is not output to the outside of the device is selected using optical modulation action of liquid crystal, whereby bright and dark images are displayed. Furthermore, those displays are combined to display an image.

REFERENCE

Patent Document

[Patent Document 1] Japanese Published Patent Application No. 2007-123861

[Patent Document 2] Japanese Published Patent Application No. 2007-096055

DISCLOSURE OF INVENTION

What is desirable is a touch panel in which a display panel is provided with a function of inputting data with a finger, a stylus, or the like touching a screen as a user interface.

Furthermore, it is demanded that an electronic appliance using a touch panel is reduced in thickness and weight. Therefore, a touch panel itself is required to be reduced in thickness and weight.

For example, in a touch panel, a touch sensor can be provided on the viewer side (the display surface side) of a display panel.

For example, in a touch panel where a capacitive touch sensor is provided so as to overlap with the display surface side of a display panel, when the distance between a pixel or a wiring of the display panel and an electrode or a wiring of the touch sensor is reduced, the touch sensor is likely to be influenced by noise caused when the display panel is driven by the touch sensor, which results in a reduction of the detection sensitivity of the touch panel in some cases.

One object of one embodiment of the present invention is to provide a thin touch panel. Another object is to provide a touch panel with high visibility. Another object is to provide a lightweight touch panel. Another object is to provide a touch panel with low power consumption.

Another object is to provide a novel input device. Another object is to provide a novel input/output device.

One embodiment of the present invention is a touch panel including a first substrate, a first conductive layer, a second conductive layer, a third conductive layer, a fourth conductive layer, a fifth conductive layer, an insulating layer, and a display element. The first conductive layer, the second conductive layer, and the third conductive layer are apart from each other on the same plane. The second conductive layer is positioned between the first conductive layer and the third conductive layer in a plan view. The first conductive layer is electrically connected to the fourth conductive layer. The third conductive layer is electrically connected to the fourth conductive layer. The second conductive layer and the fourth conductive layer overlap with each other with the insulating layer therebetween in a region. The first conductive layer has a mesh shape including a plurality of openings. The opening, the display element, and the fifth conductive layer overlap with one another in a region. The fifth conductive layer is positioned between the first conductive layer and the display element. The fifth conductive layer has a function of transmitting visible light.

In the above, the fifth conductive layer preferably contains metal oxide.

In the above, the fourth conductive layer and the fifth conductive layer are preferably formed by processing the same film.

In the above, the display element preferably contains liquid crystal.

In the above, a coloring layer is preferably provided and the coloring layer, the opening, the display element, and the fifth conductive layer preferably overlap with one another in a region.

In the above, the fifth conductive layer is preferably electrically connected to a terminal supplied with a constant potential.

In the above, it is preferable that a second substrate be provided above the first conductive layer and the first conductive layer, the second conductive layer, the third conductive layer, the fourth conductive layer, and the fifth conductive layer be formed over the second substrate.

In the above, it is preferable that a transistor electrically connected to the display element be provided, the transistor include a semiconductor layer, and the semiconductor layer and the fifth conductive layer include oxides containing the same metal element(s). In this case, it is preferable that the transistor include a first gate electrode and a second gate electrode, the semiconductor layer be positioned between the first gate electrode and the second gate electrode, and one of the first gate electrode and the second gate electrode include oxides containing the metal element(s).

In the above, it is preferable that a transistor electrically connected to the display element be provided, the transistor include a semiconductor layer, and the semiconductor layer and the fifth conductive layer contain the same oxide semiconductor. In this case, it is preferable that the transistor include a first gate electrode and a second gate electrode, the semiconductor layer be positioned between the first gate electrode and the second gate electrode, and one of the first gate electrode and the second gate electrode contain an oxide semiconductor.

According to one embodiment of the present invention, a thin touch panel can be provided. Alternatively, a touch panel with high visibility can be provided. Alternatively, a lightweight touch panel can be provided. Alternatively, a touch panel with low power consumption can be provided.

BEST MODE FOR CARRYING OUT THE INVENTION

Figure 1A:
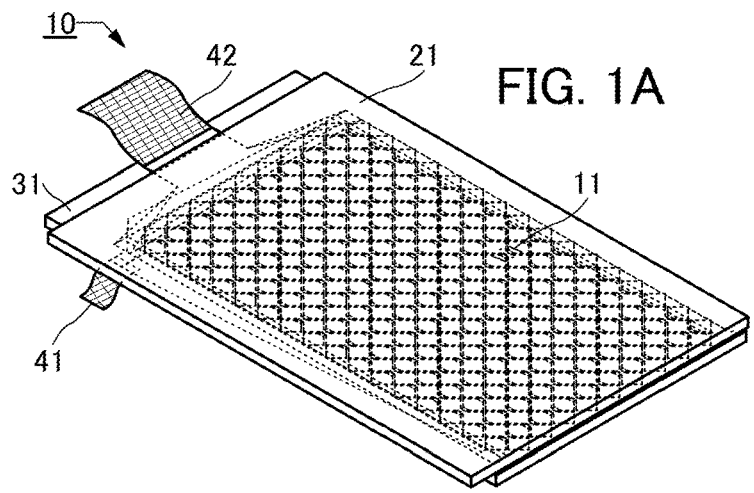
FIGS. 1A and 1B show a structure example of a touch panel module of an embodiment.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below.

Note that in the structures of the invention described below, the same portions or portions having similar functions are denoted by the same reference numerals in different drawings, and description of such portions is not repeated. Furthermore, the same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, embodiments of the present invention are not limited to such a scale.

Note that in this specification and the like, ordinal numbers such as "first", "second", and the like are used in order to avoid confusion among components and do not limit the number.

Note that the terms "film" and "layer" can be interchanged with each other in some cases. For example, in some cases, the term "conductive film" can be used instead of the term "conductive layer," and the term "insulating layer" can be used instead of the term "insulating film."

Embodiment 1

In this embodiment, a structure example of an input device (a touch sensor) of one embodiment of the present invention, and a structure example of an input/output device (a touch panel) including the input device of one embodiment of the present invention and a display device (a display panel) are described with reference to drawings.

In the description below, a capacitive touch sensor is used as the touch sensor of one embodiment of the present invention.

Note that in this specification and the like, a touch panel has a function of displaying or outputting an image or the like on or to a display surface and a function as a touch sensor capable of detecting contact or proximity of an object such as a finger or a stylus on or to the display surface. Therefore, the touch panel is an embodiment of an input/output device.

In this specification and the like, a structure in which a connector such as a flexible printed circuit (FPC) or a tape carrier package (TCP) is attached to a substrate of a touch panel, or a structure in which an integrated circuit (IC) is directly mounted on a substrate by a chip on glass (COG) method is referred to as a touch panel module or simply referred to as a touch panel in some cases.

A capacitive touch sensor that can be used for one embodiment of the present invention includes a pair of conductive layers. A capacitor is formed in the pair of conductive layers. The capacitance of the pair of conductive layers changes when an object touches or gets close to the pair of conductive layers. Utilizing this effect, detection can be conducted.

Examples of the capacitive touch sensor are a surface capacitive touch sensor and a projected capacitive touch sensor. Examples of a projected capacitive touch sensor are a self-capacitive touch sensor and a mutual capacitive touch sensor. The use of a mutual capacitive touch sensor is preferable because multiple points can be detected simultaneously.

It is preferable that a pair of conductive layers included in the touch sensor each have an opening. It is more preferable that the pair of conductive layers have a mesh shape having a plurality of openings. It is preferable that the opening and a display element overlap with each other. Such a structure enables extraction of light emitted from the display element to the outside through the opening, and therefore, the pair of conductive layers included in the touch sensor do not necessarily have a light-transmitting property. That is, a material such as metal or alloy that has lower resistance than a light-transmitting conductive material can be used as a material for the pair of conductive layers included in the touch sensor. This reduces the influence of detection signal delay or the like and increases the detection sensitivity of the touch panel. Furthermore, such a structure can be applied to large-sized display devices such as televisions as well as portable devices.

A light-blocking layer for blocking visible light is preferably provided in a position closer to the viewing side than those of the pair of conductive layers included in the touch sensor. Thus, even when a material reflecting visible light such as metal is used for the conductive layers included in the touch sensor, a reduction in visibility due to reflection of external light by the conductive layers can be prevented.

Furthermore, it is preferable that the pair of conductive layers included in the touch sensor be provided to overlap with a region between two display elements in a plan view. The pair of conductive layers included in the touch sensor are provided in a region other than an optical path of light from the display element; thus, moire is not generated in principle. Here, moire means interference fringes generated in the case where two or more regular patterns overlap with each other. As a result, a touch panel having extremely high display quality can be obtained.

As a display element in a touch panel of one embodiment of the present invention, a variety of display elements, for example, a liquid crystal element, an optical element utilizing micro electro mechanical systems (MEMS), a light-emitting element such as an organic electroluminescence (EL) element or a light-emitting diode (LED), and an electrophoretic element can be used.

Here, a transmissive or reflective liquid crystal display device including a liquid crystal element as a display element is preferably used for the touch panel.

Moreover, it is preferable that the pair of conductive layers included in the touch sensor be provided between a pair of substrates included in the touch panel. In particular, it is preferable that the conductive layer included in the touch sensor have a plurality of openings. Such a conductive layer can have a smaller surface area. Therefore, electrical noise in driving of the display element is hardly transmitted to the conductive layer as compared with the case where a light-transmitting conductive film without openings is used as the conductive layer included in the touch sensor, for example. In other words, even when both a display element and a conductive film included in the touch sensor are provided between the pair of substrates, high detection sensitivity can be achieved. As a result, a thin touch panel having high detection sensitivity can be provided.

Furthermore, it is more preferable that a conductive layer capable of supplying a constant potential be provided between a circuit for driving a display element and the pair of conductive layers included in the touch sensor. Such a conductive layer can function as a shield layer. Specifically, the conductive layer can prevent transmission of noise from the circuit for driving the display element to the touch sensor. The conductive layer can also prevent transmission of noise in driving of the touch sensor to the display element, the circuit for driving the display element, a wiring included in the circuit, or the like. Therefore, the display element and the touch sensor can be driven at the same time (can be driven in synchronization) or can be driven independently, without taking measures, for example, without preventing influence of noise by driving the display element and the touch sensor at different timings. As a result, a smooth moving image can be displayed by, for example, increasing the drive frequency (also referred to as frame rate) of the display element. Furthermore, the sensing accuracy can be increased by, for example, increasing the drive frequency of the touch sensor. Moreover, the drive frequency of the display element and the drive frequency of the touch sensor each can be freely set. For example, by providing a period during which one or both of the drive frequencies are low depending on conditions, power consumption can be reduced.

Furthermore, the conductive layer and part of the pair of conductive layers included in the touch sensor are preferably formed by processing the same conductive film. For example, a conductive layer used as a bridge at an intersection of the pair of conductive layers and the conductive layer used as the shield layer are formed by processing the same conductive film.

The conductive layer functioning as the shield layer is preferably formed using a light-transmitting conductive material. Alternatively, an oxide semiconductor whose resistance is reduced is preferably used. For example, a conductive metal oxide can be used. The use of such a material can provide a highly reliable touch panel without influence of oxidation caused in the case of using metal.

A more specific structure example of one embodiment of the present invention is described below with reference to drawings.

Structure Example

Figure 1B:
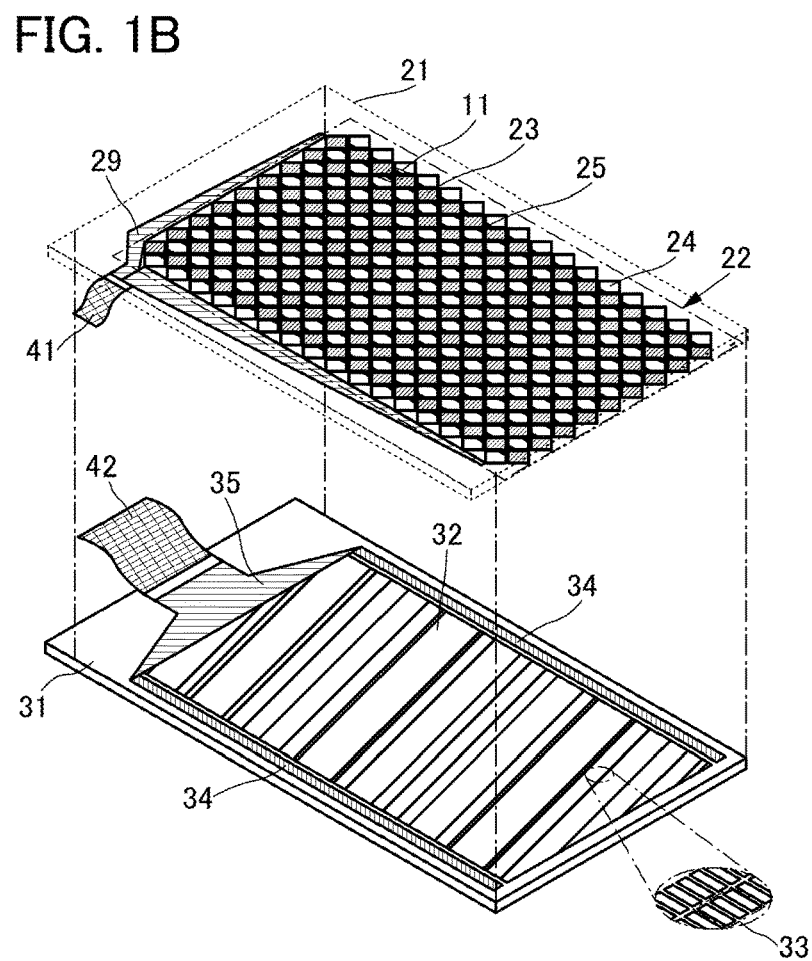

FIG. 1A is a schematic perspective view of a touch panel module 10 of one embodiment of the present invention. FIG. 1B is a schematic perspective view of the touch panel module 10 in which a pair of substrates are separated. In the touch panel module 10, a substrate 31 and a substrate 21 are attached to each other. The touch sensor 22 is provided on the substrate 21 side.

The substrate 21 is provided with an FPC 41. Furthermore, the touch sensor 22 is provided on a surface on the display panel side of the substrate 21. The touch sensor 22 includes a conductive layer 23, a conductive layer 24, a conductive layer 25, and the like. Furthermore, the touch sensor 22 includes a wiring 29 which electrically connects these conductive layers to the FPC 41. The FPC 41 has a function of supplying a signal from the outside to the touch sensor 22. Furthermore, the FPC 41 has a function of outputting a signal from the touch sensor 22 to the outside. Note that the substrate without the FPC 41 is simply referred to as a touch panel.

Note that the substrate 21 over which the touch sensor 22 is formed also can be used alone as a touch sensor substrate or a touch sensor module. For example, such a substrate can be attached to the display surface side of the display panel to form a touch panel.

The touch sensor 22 includes a plurality of conductive layers 23, a plurality of conductive layers 24, and a plurality of conductive layers 25. Each of the conductive layers 23 has a shape extending in one direction. The plurality of conductive layers 23 are arranged in a direction crossing the extending direction. Each of the conductive layers 24 is positioned between two adjacent conductive layers 23. Each of the conductive layers 25 electrically connects two conductive layers 24 adjacent in the direction crossing the extending direction of the conductive layers 23. That is, some of the conductive layers 24 arranged in the direction crossing the extending direction of the conductive layer 23 are electrically connected to each other with the conductive layers 25.

Here, there is a region where the conductive layer 23 and the conductive layer 25 overlap with each other. An insulating layer is provided between the conductive layer 23 and the conductive layer 25.

A capacitor is formed in the conductive layers 23 and 24 adjacent to each other. For example, in the case of employing a projected capacitive driving method, one of the conductive layers 23 and 24 can be used as a transmission-side electrode, and the other thereof can be used as a reception-side electrode.

Note that here, the two conductive layers 24 are electrically connected to each other with the conductive layer 25. Alternatively, it is possible to employ a structure in which the conductive layer 24 has a shape extending in one direction like the conductive layer 23, an insulating layer is provided between the conductive layer 23 and the conductive layer 24, and the conductive layer 25 is not provided. In this case, the conductive layer 23 and the conductive layer 24 partly overlap with each other.

Note that, for example, a low-resistance material is preferably used as a material of conductive films such as the conductive layer 23, the conductive layer 24, and the conductive layer 25, i.e., a wiring and an electrode in the touch panel. As an example, metal such as silver, copper, or aluminum may be used. Alternatively, a metal nanowire including a number of conductors with an extremely small width (for example, a diameter of several nanometers) may be used. Examples of such a metal nanowire include an Ag nanowire, a Cu nanowire, and an Al nanowire. In the case of using an Ag nanowire, light transmittance of 89% or more and a sheet resistance of 40 ohm/square or more and 100 ohm/square or less can be achieved. Note that because such a metal nanowire provides high transmittance, the metal nanowire may be used for an electrode of the display element, e.g., a pixel electrode or a common electrode.

A display portion 32 is provided over the substrate 31. The display portion 32 includes a plurality of pixels 33 arranged in a matrix. Each pixel 33 preferably includes a plurality of sub-pixel circuits. Each sub-pixel circuit is electrically connected to a display element. A circuit 34 electrically connected to the pixel 33 in the display portion 32 is preferably provided over the substrate 31. For example, a circuit functioning as a gate driver circuit can be used as the circuit 34. An FPC 42 has a function of supplying a signal from the outside to at least one of the display portion 32 and the circuit 34. An IC functioning as a source driver circuit is preferably mounted on the substrate 31 or the FPC 42. The IC can be mounted on the substrate 31 by a COG method. Alternatively, the FPC 42, a TAB, a TCP, or the like on which an IC is mounted can be attached to the substrate 31.

The touch panel module of one embodiment of the present invention can output positional information based on the change in capacitance by the touch sensor 22 at the time of a touch motion. Furthermore, the display portion 32 can display an image.

Cross-Sectional Structure Example 1

A cross-sectional structure example of the touch panel module 10 is described below with reference to drawings. The touch panel module 10 described below as an example is a module in which a liquid crystal element of a lateral electric field mode is used as a display element.

Figure 2:
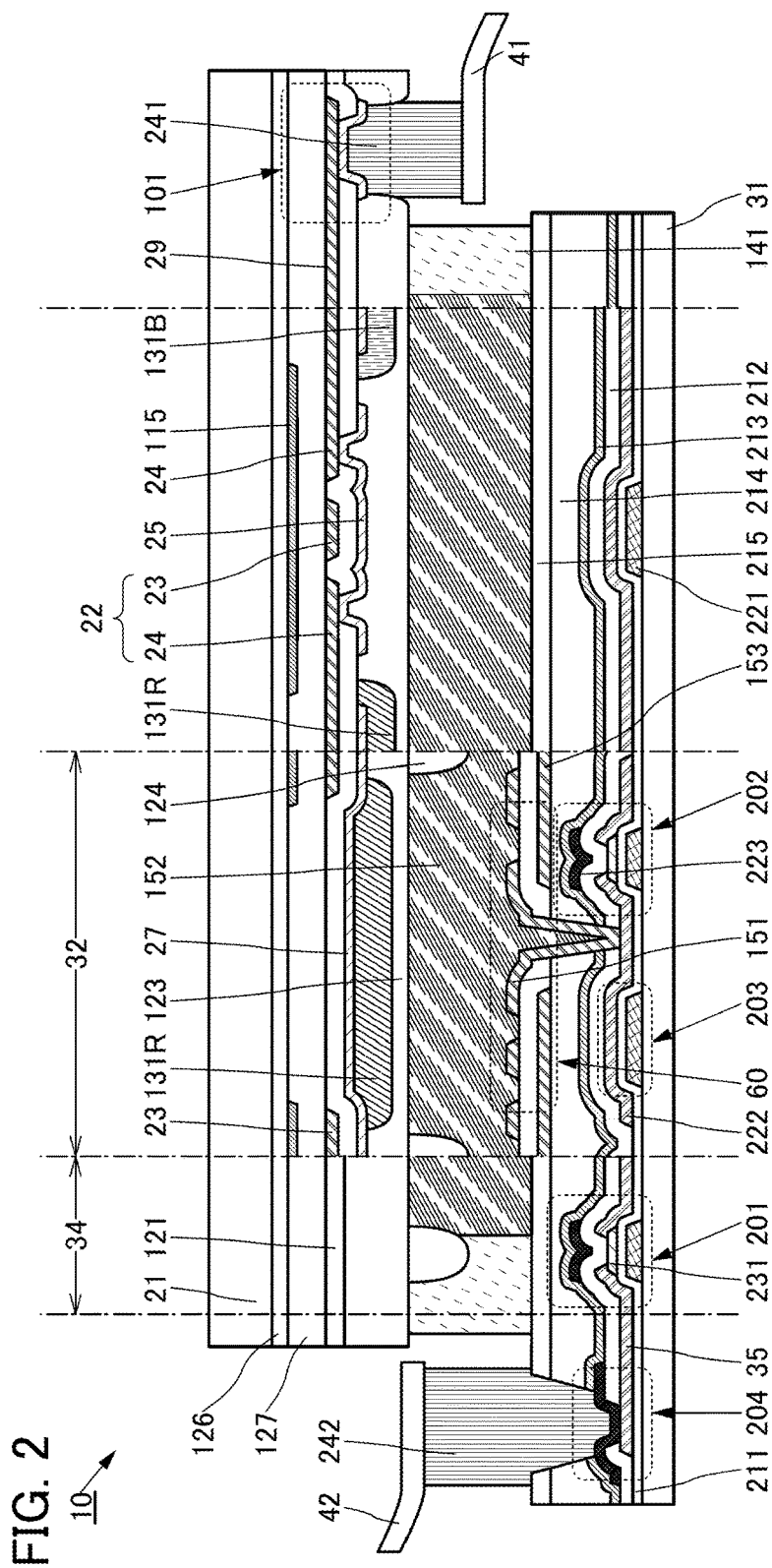
FIG. 2 shows a structure example of a touch panel module of an embodiment.

FIG. 2 is a schematic cross-sectional view of the touch panel module 10. FIG. 2 illustrates cross sections of a region including the FPC 42, a region including the circuit 34, a region including the display portion 32, a region including the FPC 41, and the like in FIG. 1A.

The substrate 21 and the substrate 31 are attached to each other with an adhesive layer 141. A region surrounded by the substrate 21, the substrate 31, and the adhesive layer 141 is filled with a liquid crystal 152.

The touch sensor 22 including the conductive layer 23 and the conductive layer 24, a connection portion 101, a wiring 29, a display element 60, a transistor 201, a transistor 202, a capacitor 203, a connection portion 204, a wiring 35, and the like are provided between the substrate 31 and the substrate 21.

Insulating layers such as an insulating layer 211, an insulating layer 212, an insulating layer 213, and an insulating layer 214 are provided over the substrate 31. Part of the insulating layer 211 functions as a gate insulating layer of each transistor, and another portion thereof functions as a dielectric of the capacitor 203. The insulating layer 212, the insulating layer 213, and the insulating layer 214 are provided to cover each transistor, the capacitor 203, and the like. The insulating layer 214 functions as a planarization layer. Note that an example where the three insulating layers, the insulating layers 212, 213, and 214, are provided to cover the transistors and the like is described here; however, the present invention is not limited to this example, and four or more insulating layers, a single insulating layer, or two insulating layers may be provided. The insulating layer 214 functioning as a planarization layer is not necessarily provided when not needed.

A conductive layer 221, a conductive layer 222, a conductive layer 223, a semiconductor layer 231, a conductive layer 151, and the like are provided over the substrate 31. Here, a plurality of layers obtained by processing the same conductive film are denoted by the same reference numeral in some cases.

The conductive layer 221 can be used for a gate electrode of each transistor, one electrode of the capacitor 203, a wiring, or the like. The conductive layer 222 can be used for a source electrode or a drain electrode of each transistor, the other electrode of the capacitor 203, a wiring, or the like. The conductive layer 223 can be used for another gate electrode of each transistor, a wiring, or the like. The semiconductor layer 231 can be used for a semiconductor layer of a transistor or the like.

FIG. 2 illustrates a cross section of one sub-pixel as an example of the display portion 32. For example, the sub-pixel is a sub-pixel exhibiting a red color, a sub-pixel exhibiting a green color, or a sub-pixel exhibiting a blue color; thus, full-color display can be achieved. The sub-pixel illustrated in FIG. 2 includes, for example, the transistor 202, the capacitor 203, the display element 60, and a coloring layer 131R. Here, the sub-pixel circuit includes the transistor 202, the capacitor 203, a wiring, and the like.

FIG. 2 illustrates an example of the circuit 34 in which the transistor 201 is provided.

In the example illustrated in FIG. 2, the transistors 201 and 202 each have a structure in which the semiconductor layer 231 where a channel is formed is provided between two gate electrodes (conductive layers 221 and 223). Such transistors can have higher field-effect mobility and thus have higher on-state current than other transistors. Consequently, a circuit capable of high-speed operation can be obtained. Furthermore, the area occupied by a circuit portion can be reduced. The use of the transistor having high on-state current can reduce signal delay in wirings and can reduce display unevenness even in a display panel or a touch panel in which the number of wirings is increased because of increase in size or resolution.

Here, FIG. 2 or the like shows an example where the transistor 202, the capacitor 203, and the like are under the display element 60 for simplicity. In the case of a reflective liquid crystal display device, a wiring included in a transistor, a capacitor, or a circuit or the like and the display element 60 are provided to overlap with each other in this manner, whereby the aperture ratio can be increased. In the case of a transmissive liquid crystal display device, it is preferable to use a structure where a layer containing a light-transmitting material is provided below the display element 60 and the transistor 202, the capacitor 203, and the like are not provided below the display element 60.

Figure 3:
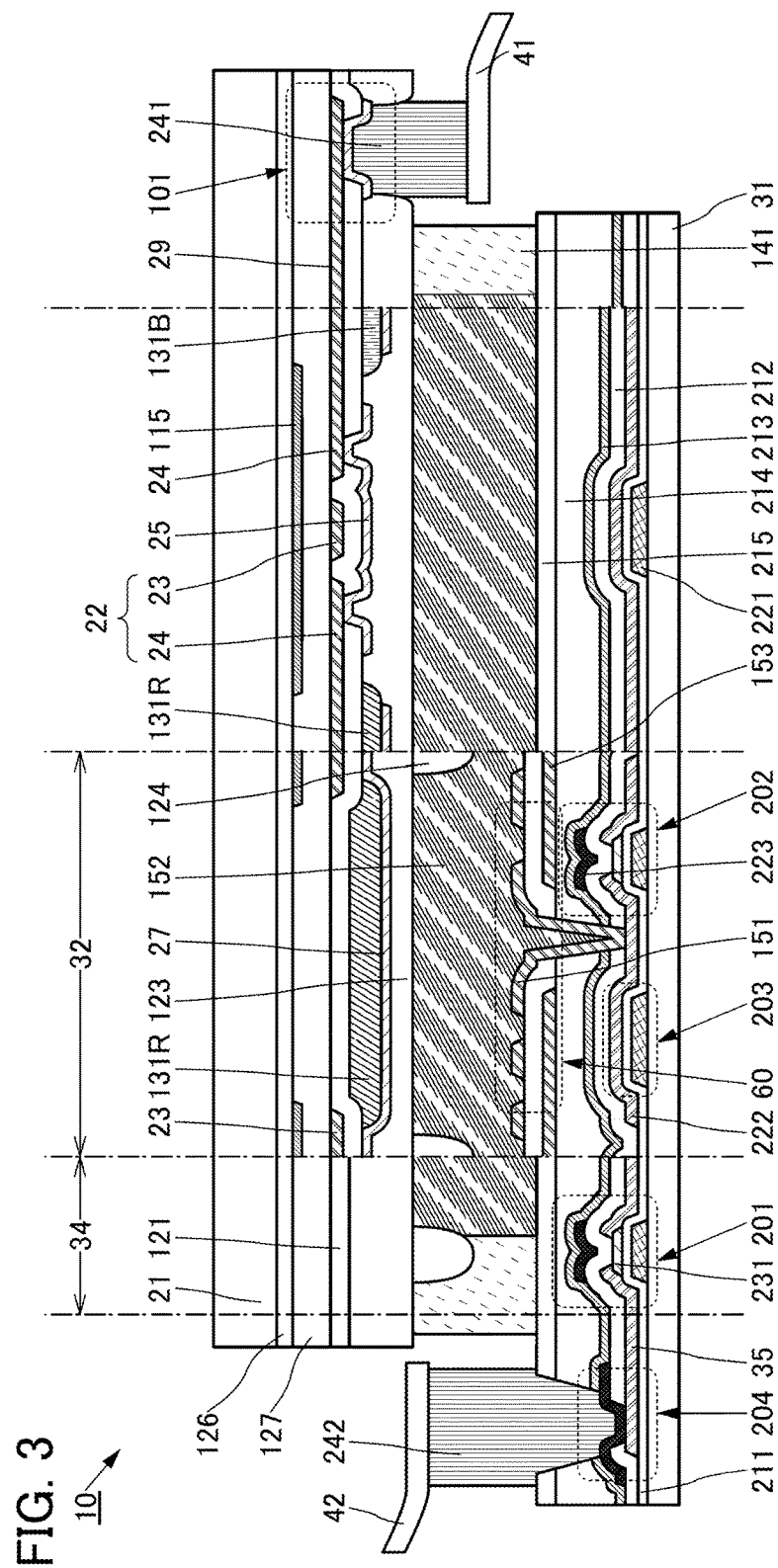
FIG. 3 shows a structure example of a touch panel module of an embodiment.

Furthermore, in the case of a reflective liquid crystal display device, it is preferable that the conductive layer 151 be provided to overlap with the semiconductor layer 231 of the transistor 202 as illustrated in FIG. 2 because the aperture ratio of the sub-pixels can be increased. In this case, the conductive layer 223 is preferably provided between the conductive layer 151 and the semiconductor layer 231. The conductive layer 223 prevents influence of the electric field of the conductive layer 151 on the semiconductor layer 231, and a malfunction is suppressed. In the case where the conductive layer 223 is not provided, the semiconductor layer 231 and the conductive layer 151 are preferably provided not to overlap with each other as illustrated in FIG. 3, for example.

Note that the transistor included in the circuit 34 and the transistor included in the display portion 32 may have the same structure. A plurality of transistors included in the circuit 34 may have the same structure or different structures. A plurality of transistors included in the display portion 32 may have the same structure or different structures.

A material through which impurities such as water or hydrogen do not easily diffuse is preferably used for at least one of the insulating layers 212 and 213 which cover the transistors. That is, the insulating layer 212 or the insulating layer 213 can function as a barrier film. Such a structure can effectively suppress diffusion of the impurities into the transistors from the outside, and a highly reliable touch panel can be provided.

In the example illustrated in FIG. 2, a liquid crystal element using a fringe field switching (FFS) mode is used as the display element 60. The display element 60 includes the conductive layer 151, the liquid crystal 152, and a conductive layer 153. Alignment of the liquid crystal can be controlled with an electric field generated between the conductive layer 151 and the conductive layer 153.

The conductive layer 153 is provided over the insulating layer 214. An insulating layer 215 is provided to cover the conductive layer 153, and the conductive layer 151 is provided over the insulating layer 215. The conductive layer 151 is electrically connected to one of a source and a drain of the transistor 202 in an opening provided in the insulating layers 212 to 215.

The top surface shape (also referred to as planar shape) of the conductive layer 151 is a comb-like shape or includes a slit. The conductive layer 153 is provided to overlap with the conductive layer 151. In a region overlapping with the coloring layer 131R or the like, there is a portion where the conductive layer 151 is not provided over the conductive layer 153.

In FIG. 2, the conductive layer 151 functions as a pixel electrode and the conductive layer 153 functions as a common electrode. Alternatively, the conductive layer 151 which is provided in an upper layer and whose top surface shape is a comb-like shape or includes a slit may be used as the common electrode, and the conductive layer 153 which is provided in a lower layer may be used as the pixel electrode. In that case, the conductive layer 153 may be electrically connected to one of the source and the drain of the transistor 202.

An insulating layer 126, a light-blocking layer 115, an insulating layer 127, the conductive layer 23, the conductive layer 24, the conductive layer 25, the wiring 29, an insulating layer 121, an insulating layer 123, a spacer 124, the coloring layer 131R, a coloring layer 131B, and the like are provided on the substrate 31 side of the substrate 21.

In FIG. 2, a cross section of an intersection of the conductive layer 23 and the conductive layer 24 is illustrated. The conductive layer 23 and the conductive layer 24 are provided on the same plane. The insulating layer 121 is provided between the conductive layer 25 and the conductive layers 23 and 24. Part of the conductive layer 25 overlaps with the conductive layer 23. The two conductive layers 24 between which the conductive layer 23 is provided are electrically connected to the conductive layer 25 through openings provided in the insulating layer 121.

The coloring layer 131R and the like are provided on the substrate 31 side of the conductive layer 27. The insulating layer 123 is provided to cover the coloring layer 131R and the like.

In FIG. 2, the display element 60 includes the conductive layer 151, part of the conductive layer 153, and the liquid crystal 152 positioned above them.

Alignment films for controlling alignment of the liquid crystal 152 may be provided on surfaces of the conductive layer 151, the insulating layer 214, and the like which are in contact with the liquid crystal 152.

In the structure of FIG. 2, the conductive layer 23 is provided not to overlap with the display element 60. In other words, the conductive layer 23 is provided so that the display element 60 overlaps with an opening in the conductive layer 23. In still other words, the conductive layer 23 is provided to overlap with a region between the two conductive layers 151 of two adjacent sub-pixels. Although an example of the conductive layer 23 is described here, it is preferable that the conductive layer 24 and the conductive layer 25 be also provided not to overlap with the display element 60.

In the case where the display element 60 is a reflective liquid crystal element, for example, one or both of the conductive layers 151 and 153 can be formed using a material that reflects visible light. When both of them are formed using a material that reflects visible light, the aperture ratio can be increased. The conductive layer 153 may be formed using a material that reflects visible light and the conductive layer 151 may be formed using a material that transmits visible light. By having such a structure, the display element 60 can be a reflective liquid crystal element.

Meanwhile, in the case where the display element 60 is a transmissive liquid crystal element, one or both of the conductive layers 151 and 153 can be formed using a material that transmits visible light. When both of them are formed using a material that transmits visible light, the aperture ratio can be increased. The conductive layer 153 may be formed using a material that transmits visible light and the conductive layer 151 may be formed using a material that blocks visible light.

In the case where the display element 60 is a transmissive liquid crystal element, two polarizing plates which are not illustrated are provided such that the display portion is sandwiched therebetween, for example. Light from a backlight provided on an outer side than the polarizing plate enters through the polarizing plate. At this time, alignment of the liquid crystal 152 is controlled with a voltage applied between the conductive layer 151 and the conductive layer 153, whereby optical modulation of light can be controlled. In other words, the intensity of light emitted through the polarizing plate can be controlled. Light other than one in a particular wavelength region of the incident light is absorbed by the coloring layer 131R, and thus, red light is emitted, for example.

In addition to the polarizing plate, a circularly polarizing plate can be used, for example. As the circularly polarizing plate, for example, a stack including a linear polarizing plate and a quarter-wave retardation plate can be used. With the circularly polarizing plate, the viewing angle dependency can be reduced.

Here, as for the display element 60, a pair of electrodes are provided in a direction substantially perpendicular to the thickness direction of the touch panel module 10 and an electric field is applied to the liquid crystal 152 in the direction substantially perpendicular to the thickness direction. The arrangement of the electrodes is not limited thereto, and a method in which an electric field is applied in the thickness direction may be employed.

Liquid crystal elements using a variety of modes can be used as the liquid crystal element which can be used for the display element 60. For example, a liquid crystal element using a vertical alignment (VA) mode, a twisted nematic (TN) mode, an in-plane switching (IPS) mode, a fringe field switching (FFS) mode, an axially symmetric aligned microcell (ASM) mode, an optically compensated birefringence (OCB) mode, a ferroelectric liquid crystal (FLC) mode, an antiferroelectric liquid crystal (AFLC) mode, or the like can be used.

Furthermore, a normally black liquid crystal display device, for example, a transmissive liquid crystal display device using a vertical alignment (VA) mode may be used as the touch panel module 10. Some examples are given as the vertical alignment mode; for example, a multi-domain vertical alignment (MVA) mode, a patterned vertical alignment (PVA) mode, or an advanced super view (ASV) mode can be used.

The liquid crystal element controls transmission or non-transmission of light utilizing an optical modulation action of liquid crystal. Note that optical modulation action of liquid crystal is controlled by an electric field applied to the liquid crystal (including a horizontal electric field, a vertical electric field, and an oblique electric field). As the liquid crystal used for the liquid crystal element, thermotropic liquid crystal, low-molecular liquid crystal, high-molecular liquid crystal, polymer dispersed liquid crystal (PDLC), ferroelectric liquid crystal, anti-ferroelectric liquid crystal, or the like can be used. These liquid crystal materials exhibit a cholesteric phase, a smectic phase, a cubic phase, a chiral nematic phase, an isotropic phase, or the like depending on conditions.

As the liquid crystal material, either of a positive liquid crystal and a negative liquid crystal may be used, and an appropriate liquid crystal material can be used depending on the mode or design to be used.

Alternatively, in the case of employing a horizontal electric field mode, a liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which several weight percent or more of a chiral material is mixed is used for the liquid crystal layer in order to improve the temperature range. The liquid crystal composition which includes liquid crystal exhibiting a blue phase and a chiral material has a short response time and optical isotropy. In addition, the liquid crystal composition which includes liquid crystal exhibiting a blue phase and a chiral material has a small viewing angle dependence. An alignment film does not need to be provided and rubbing treatment is thus not necessary; accordingly, electrostatic discharge damage caused by the rubbing treatment can be prevented and defects and damage of the liquid crystal display device in the manufacturing process can be reduced.

The conductive layer 27 is provided to cover a region of the display portion 32 where the conductive layer 25 is not provided.

As illustrated in FIG. 2 or the like, the conductive layer 25 and the conductive layer 27 are preferably formed by processing the same film.

The conductive layer 25 and the conductive layer 27 are preferably formed using a conductive material transmitting visible light.

The conductive layers 25 and 27 transmitting visible light include, for example, a conductive material containing a metal oxide. For example, a metal oxide can be used among light-transmitting conductive materials described later.

Alternatively, the conductive layer 25 and the conductive layer 27 are preferably formed using a metal oxide containing the same metal element as another conductive layer or semiconductor layer. In particular, in the case where an oxide semiconductor is used for the semiconductor layer of the transistor in the touch panel module 10, a conductive oxide containing a metal element contained in the oxide semiconductor is preferably used.

The use of the conductive metal oxide for the conductive layer 27 suppresses oxidation of its surface, whereby the touch panel module 10 can be highly reliable.

In FIG. 2, the conductive layer 27 is provided to overlap with the conductive layers 23 and 24 and the like. By applying a common potential, a ground potential, or another arbitrary constant potential to the conductive layer 27, electrical noise generated to the substrate 31 side when the conductive layers 23 and 24 are driven can be blocked. Furthermore, electrical noise generated to the substrate 21 side when the sub-pixel circuit provided on the substrate 31 side is driven can be blocked.

In this case, a constant potential which does not influence switching of the liquid crystal 152 may be supplied to the conductive layer 27. For example, a ground potential, a common potential, or an arbitrary constant potential can be used. The conductive layer 27 and the conductive layer 153 may be set at the same potential, for example.

By applying an appropriate potential to the conductive layer 27, a component in the thickness direction in the direction of an electric field (the direction of the lines of electric force) generated between the conductive layer 151 and the conductive layer 153 can be reduced and an electric field can be effectively applied in the direction (lateral direction) substantially perpendicular to the thickness direction. Thus, an alignment defect in the liquid crystal 152 can be suppressed and a malfunction such as light leakage can be prevented.

The connection portion 204 is provided in a region near an end portion of the substrate 31. The connection portion 204 is electrically connected to the FPC 42 through a connection layer 242. FIG. 2 illustrates an example of the connection portion 204 formed by stacking part of the wiring 35 and the conductive layer 223. The connection portion 101 is provided in a region near an end portion of the substrate 21. The connection portion 101 is electrically connected to the FPC 41 through a connection layer 241. In the example of the structure illustrated in FIG. 2, the connection portion 101 is formed by stacking part of the wiring 29, and a conductive layer formed by processing the conductive film used for forming the conductive layer 25.

In FIG. 2, a cross-sectional structure of an intersection of the conductive layer 221 functioning as a wiring and the conductive layer 222 functioning as a wiring is illustrated as an example. For example, the conductive layer 221 can be used as one or both of a wiring functioning as a scan line and a wiring functioning as a capacitor line, and the conductive layer 222 can be used as a wiring functioning as a signal line.

A substrate with which an object to be sensed, such as a finger or a stylus, is to be in contact may be provided above the substrate 21. In addition, a polarizing plate or a circularly polarizing plate is preferably provided between the substrate 21 and the above substrate. In that case, a protective layer (such as a ceramic coat) is preferably provided over the substrate. The protective layer can be formed using an inorganic insulating material such as silicon oxide, aluminum oxide, yttrium oxide, or yttria-stabilized zirconia (YSZ). Alternatively, tempered glass may be used for the substrate. The tempered glass which can be used here is one that has been subjected to physical or chemical treatment by an ion exchange method, a thermal tempering method, or the like and has a surface to which compressive stress has been added.

The insulating layer 123 has a function of an overcoat preventing impurities such as a pigment included in the coloring layer 131R or the like from diffusing into the liquid crystal 152.

The spacer 124 is provided over the insulating layer 123 and has a function of keeping a certain distance between the substrate 21 and the substrate 31. Although FIG. 2 illustrates an example where the spacer 124 is not in contact with structures (e.g., the conductive layer 151 and the insulating layer 214) on the substrate 31 side, the spacer 124 may be in contact with them. Moreover, FIG. 2 illustrates an example where the spacer 124 is provided on the substrate 21 side; however, the spacer 124 may be provided on the substrate 31 side. For example, the spacer 124 may be provided between the two conductive layers 151 of the two adjacent sub-pixels. Alternatively, a particulate spacer may be used as the spacer 124. Although a material such as silica can be used for the particulate spacer, an elastic material such as an organic resin or rubber is preferably used. In some cases, the particulate spacer may be vertically crushed.

It is preferable that the spacer 124 and the conductive layer 23 (or the conductive layer 24 or 25) are preferably provided to overlap with each other as illustrated in FIG. 2. In such a structure, the spacer 124 is not provided in a portion where the display element 60 is provided, in which case absorption, refraction, or diffusion of light due to the spacer 124 does not occur, for example; thus, the light-extraction efficiency can be improved.

In the touch panel module 10 of one embodiment of the present invention, the light-blocking layer 115 suppressing color mixture between adjacent sub-pixels is provided in a position closer to the substrate 21 side than those of the conductive layers 23 and 24. Thus, the light-blocking layer 115 can prevent a reduction in visibility which is caused by reflection of external light by the conductive layers 23 and 24. For that reason, the conductive layers 23 and 24 can be formed using a material that reflects visible light. Alternatively, even in the case where a material that transmits visible light is used, the visibility can be improved because a boundary between a portion where the conductive layer 23 or the conductive layer 24 is provided and a portion where the conductive layer 23 or the conductive layer 24 is not provided is not observed.

Meanwhile, since the conductive layer 27 is formed using a material that transmits visible light, light passing through the display element 60, the coloring layer 131R, or the like passes through the conductive layer 27 and is emitted to the outside.

Although FIG. 2 illustrates the structure where the insulating layer 123 is provided to cover the coloring layer 131R and the like, the insulating layer 123 may be omitted. With such a structure, a photomask necessary for manufacturing the touch panel module 10 and a patterning step can be omitted.

FIG. 2 illustrates the case where the conductive layer 27 is provided in a position closer to the substrate 21 side than that of the coloring layer 131R; however, the structure is not limited thereto as long as they are provided to overlap with each other.

In the touch panel module 10 in FIG. 3, the conductive layer 27 is provided in a position closer to the substrate 31 side than that of the coloring layer 131R.

Figure 4:
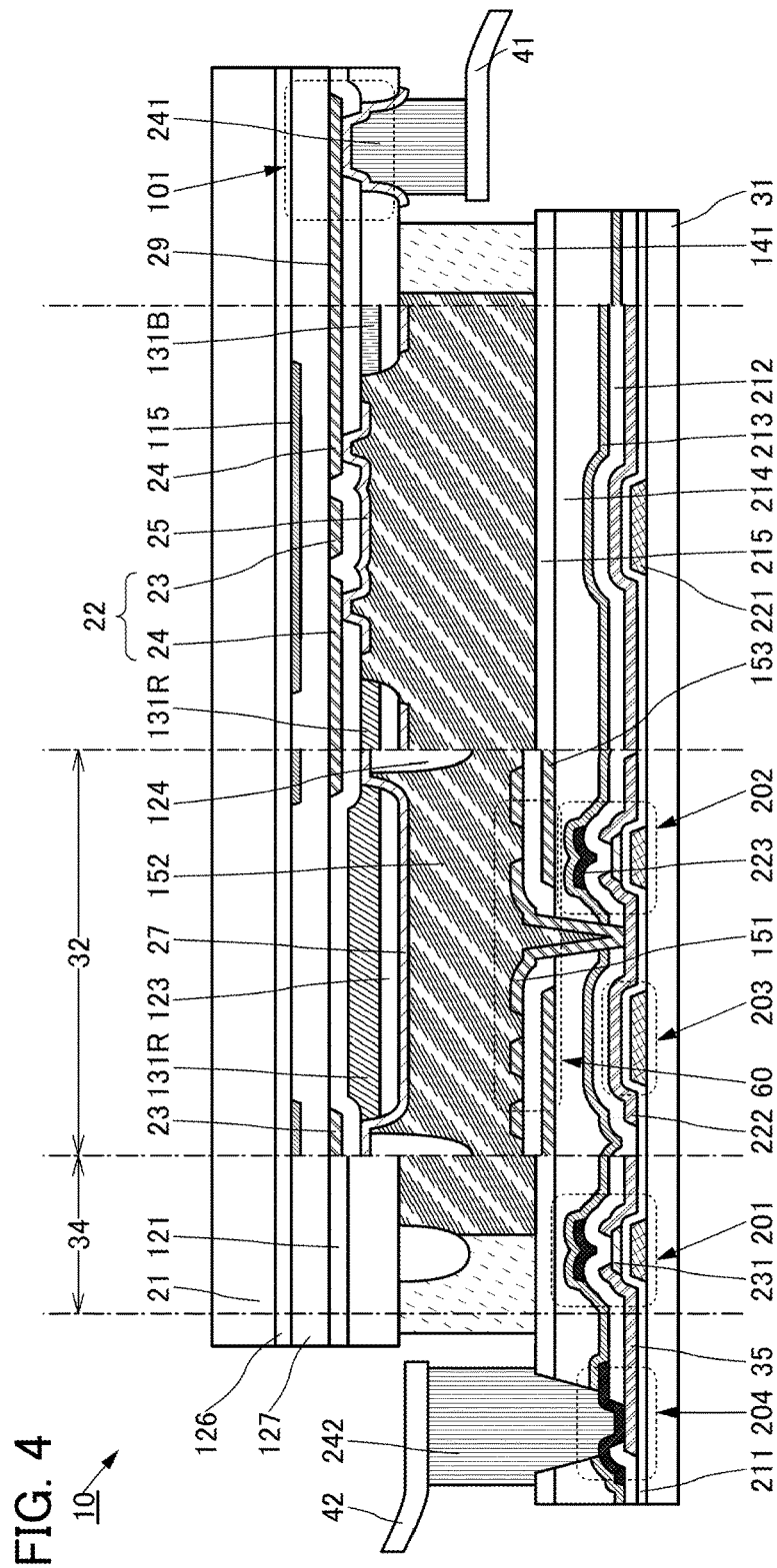
FIG. 4 shows a structure example of a touch panel module of an embodiment.
Figure 5:
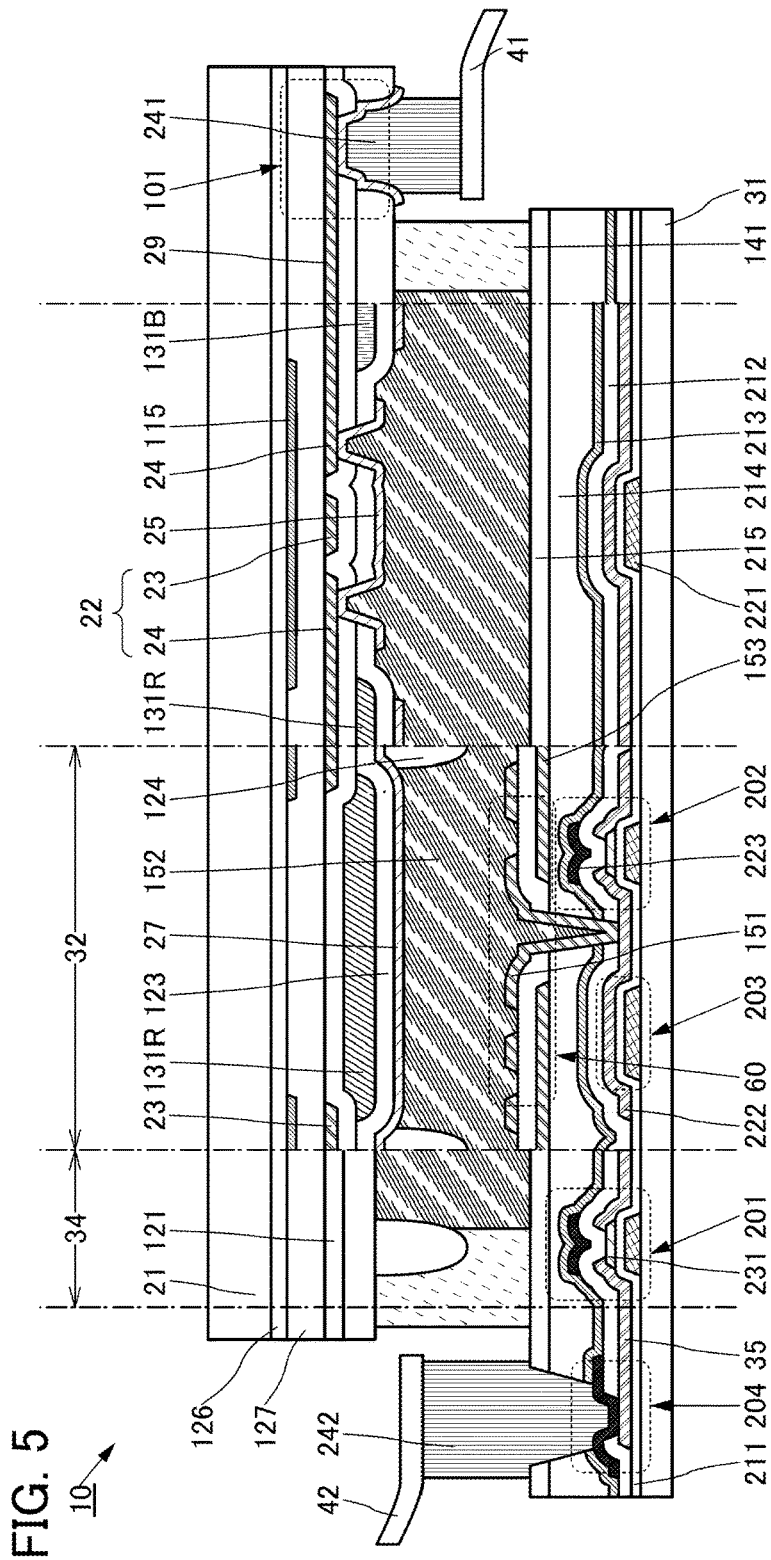
FIG. 5 shows a structure example of a touch panel module of an embodiment.

In each of the touch panel modules illustrated in FIG. 4 and FIG. 5, the conductive layer 27 is provided in a position closer to the substrate 31 side than that of the insulating layer 123.

FIG. 4 is different from FIG. 5 in the shape of an opening provided in the insulating layer 123.

In FIG. 4, an opening is formed in the insulating layer 123 to include a position where the conductive layer 25 is provided and its vicinity so that the conductive layer 25 and the insulating layer 123 do not overlap with each other.

Meanwhile, in FIG. 5, the insulating layer 123 is processed so that part of the insulating layer 123 is provided between the conductive layer 25 and the insulating layer 121. In this structure, the conductive layer 25 and the conductive layer 24 are electrically connected to each other through an opening provided in the insulating layers 121 and 123.

Figure 6:
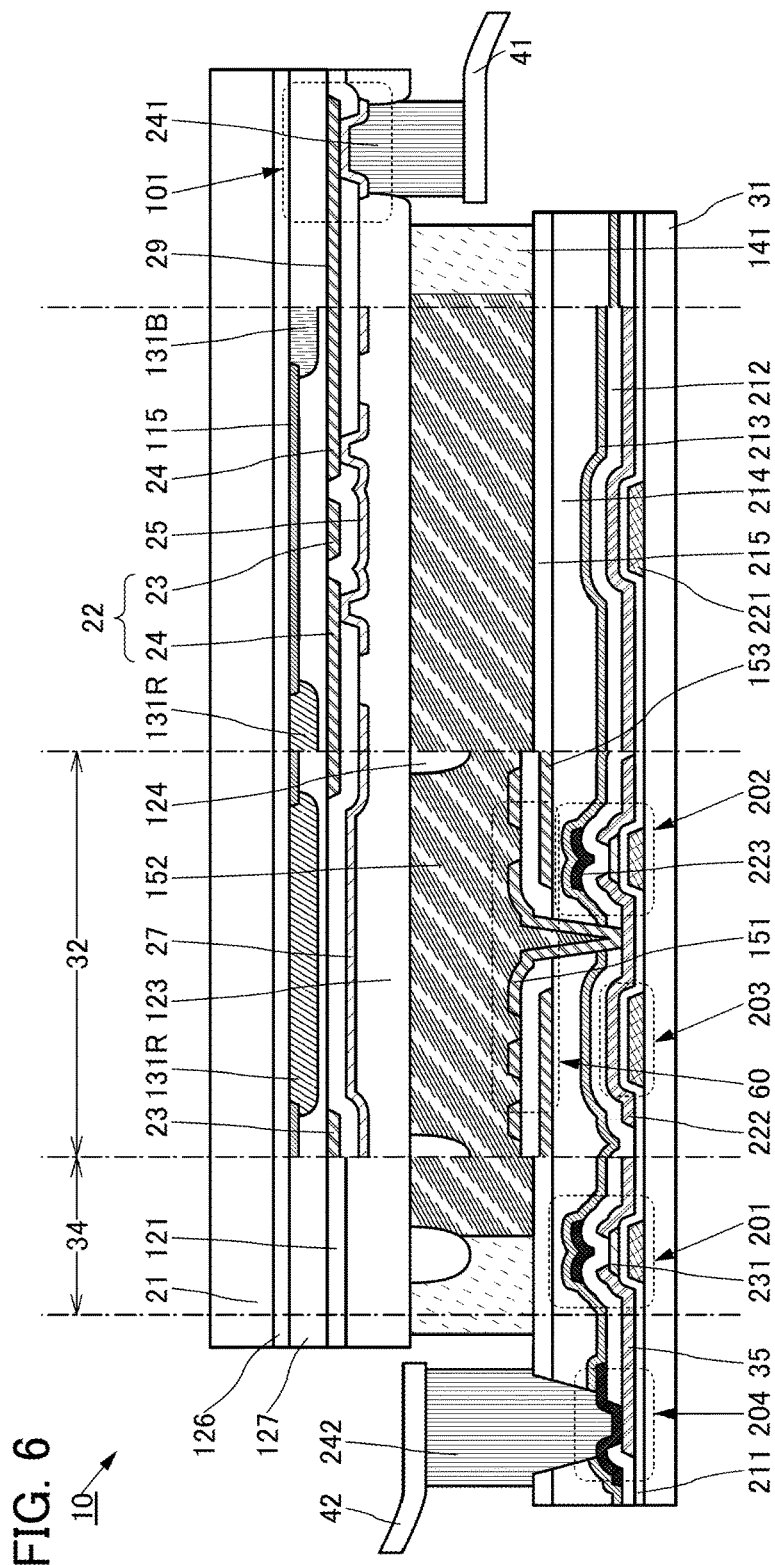
FIG. 6 shows a structure example of a touch panel module of an embodiment.

FIG. 6 illustrates an example where the coloring layer 131R and the like are provided in positions closer to the substrate 21 side than that of the conductive layer 27. In the structure illustrated in FIG. 6, the insulating layer 127 is provided to cover the coloring layer 131R. When a step of the coloring layer 131R or the like is covered with the insulating layer 127, the planarity of surfaces where the conductive layers 23 and 24 and the like are formed is increased and thus, the uniformity of the detection sensitivity can be increased.

The above is the description of Cross-sectional Structural Example 1.

Cross-Sectional Structural Example 2

A cross-sectional structure example partly different from the above structure is described. Specifically, an example of a cross-sectional structure in which an oxide semiconductor is used for the conductive layers 25 and 27 is described.

Figure 7:
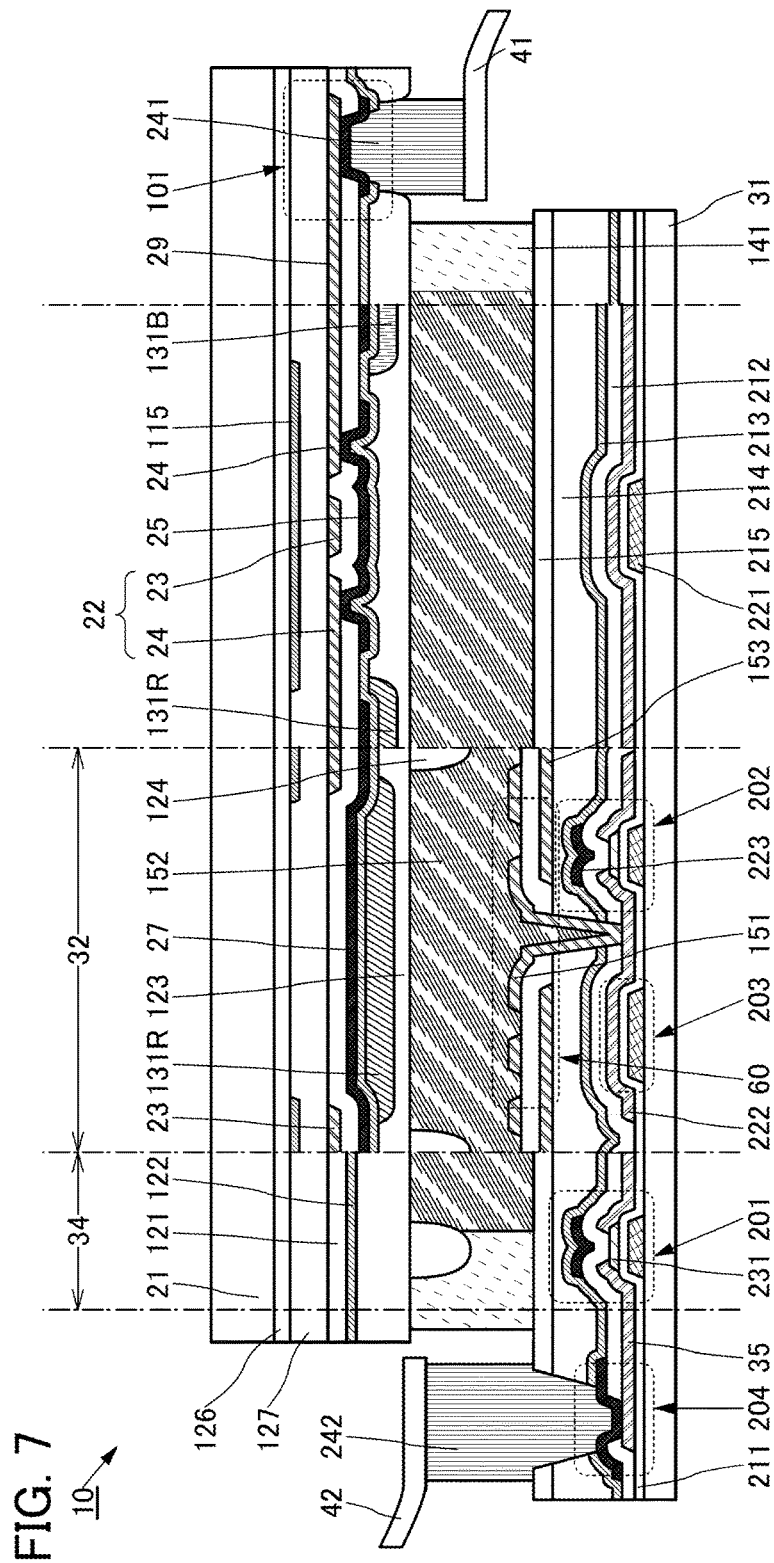
FIG. 7 shows a structure example of a touch panel module of an embodiment.
Figure 8:
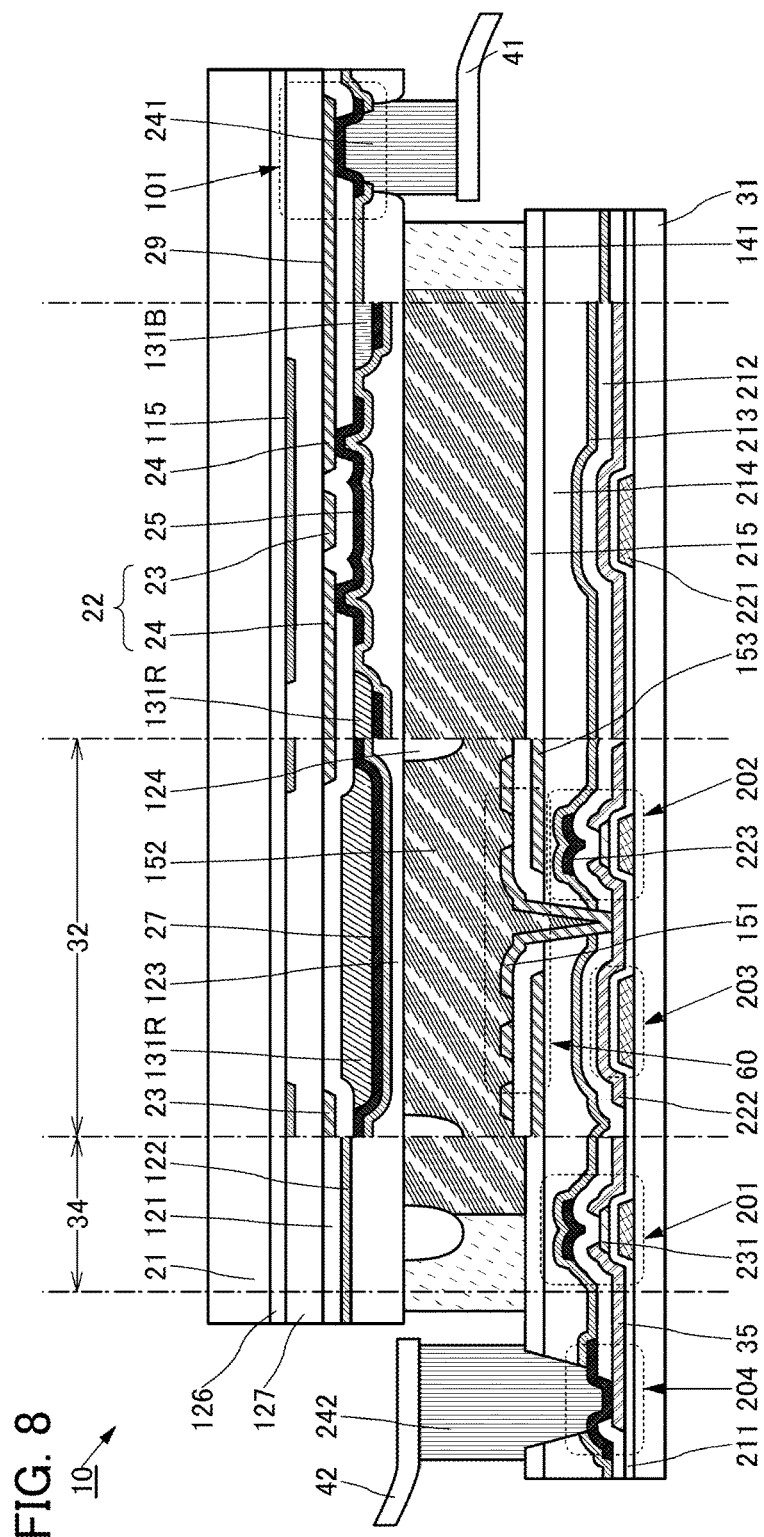
FIG. 8 shows a structure example of a touch panel module of an embodiment.
Figure 9:
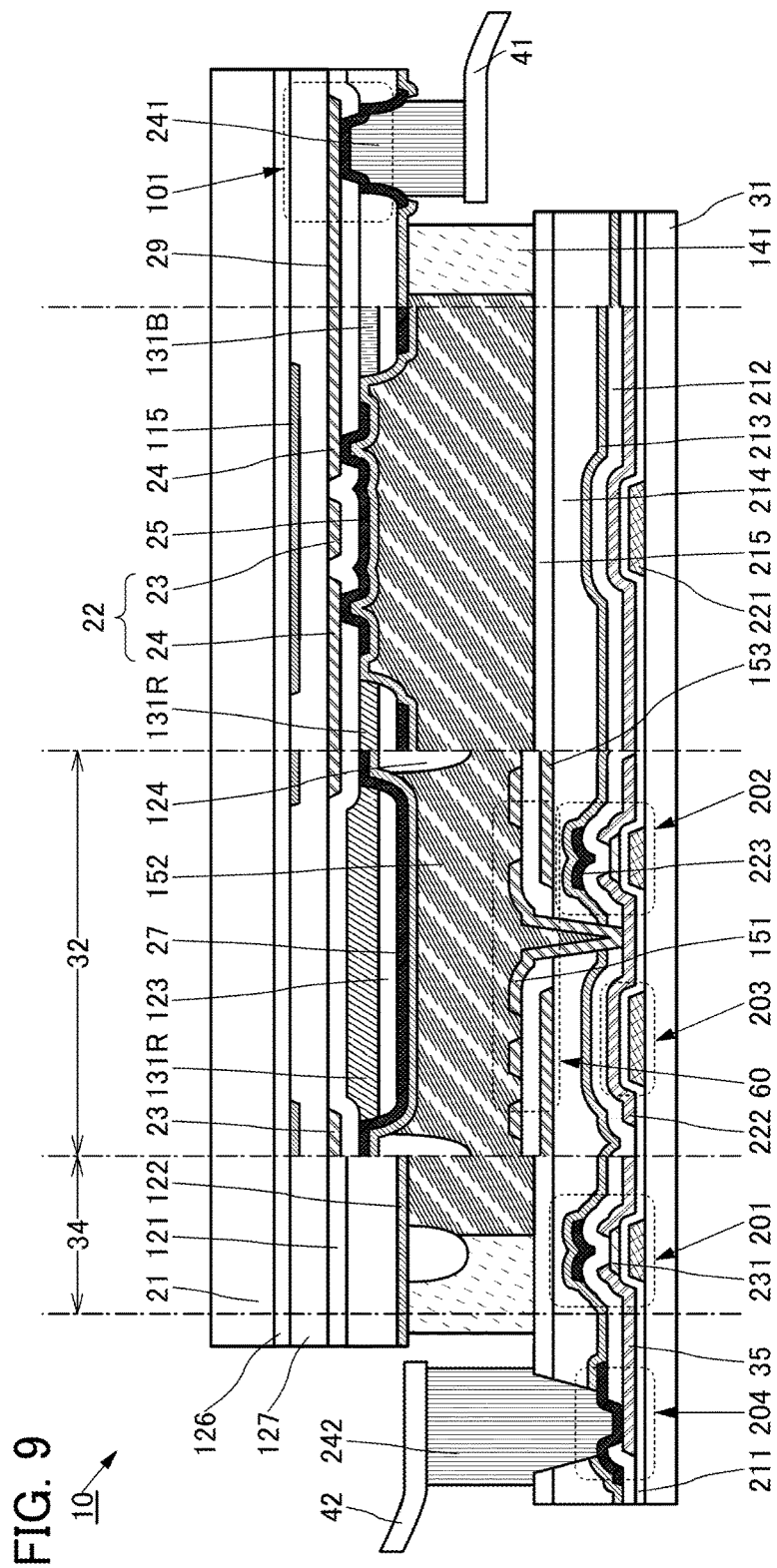
FIG. 9 shows a structure example of a touch panel module of an embodiment.
Figure 10:
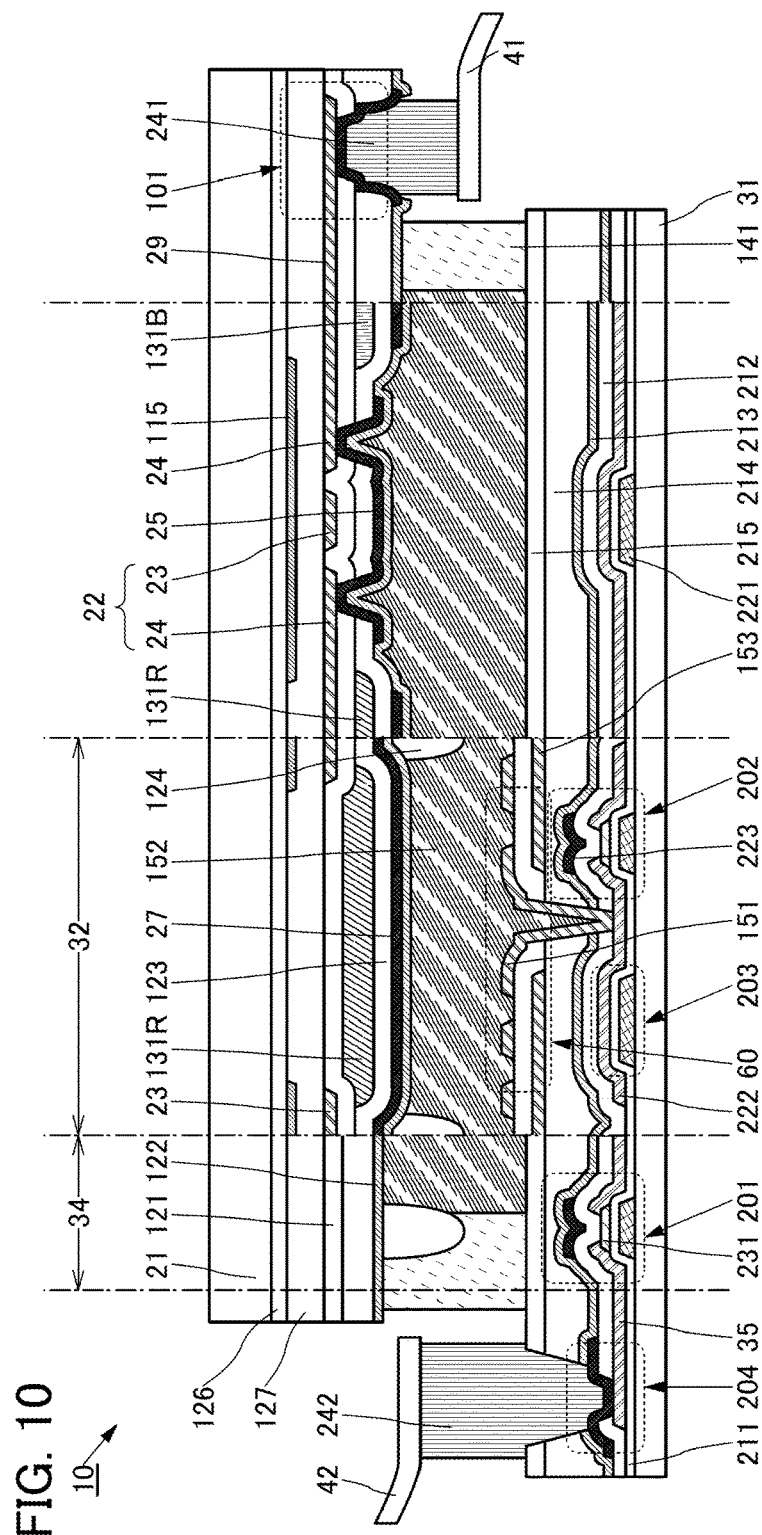
FIG. 10 shows a structure example of a touch panel module of an embodiment.
Figure 11:
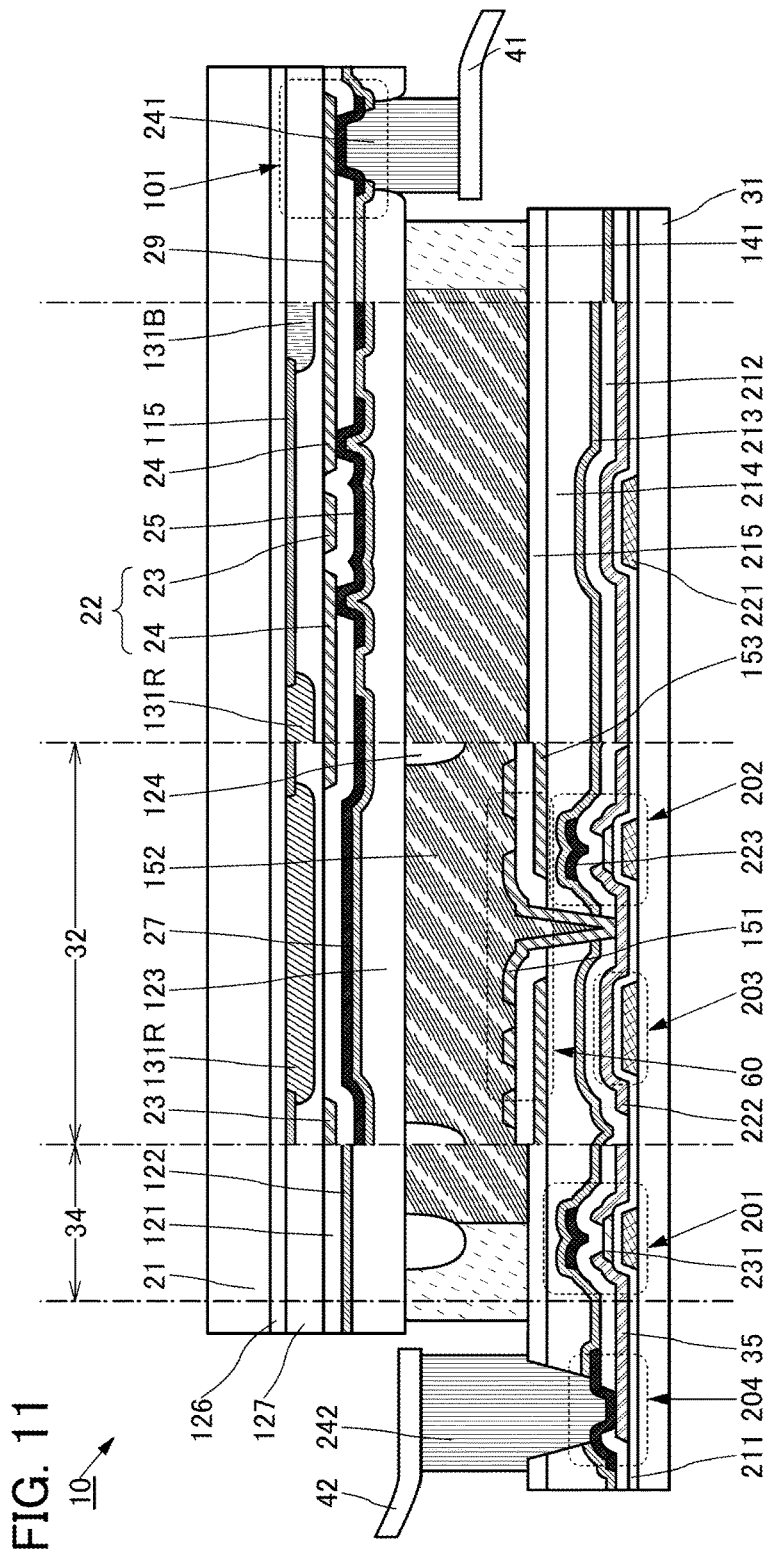
FIG. 11 shows a structure example of a touch panel module of an embodiment.

FIG. 7 is different from FIG. 2 mainly in that an insulating layer 122 covering the conductive layers 25 and 27 and the like is provided.

The conductive layers 25 and 27 preferably include a low-resistance oxide semiconductor. In particular, in the case where an oxide semiconductor is used for a semiconductor layer of a transistor in the touch panel module 10, the conductive layers 25 and 27 are preferably formed using an oxide semiconductor whose resistivity is lower than that of the oxide semiconductor used for the semiconductor layer.

The resistivity of the conductive layer 27 can be reduced, for example, by a method for controlling the resistivity of an oxide semiconductor which is described later.

In this case, an insulating layer containing much hydrogen is preferably used as the insulating layer 122 covering the conductive layers 25 and 27. In particular, the insulating layer 122 preferably includes an insulating film containing silicon nitride.

The use of a conductive metal oxide or a low-resistance oxide semiconductor for the conductive layer 27 suppresses oxidation of its surface, so that the touch panel module 10 having high reliability can be provided.

FIG. 8, FIG. 9, FIG. 10, and FIG. 11 show examples where the insulating layer 122 is added in FIG. 3, FIG. 4, FIG. 5, and FIG. 6, respectively. In each of FIG. 8, FIG. 9, FIG. 10, and FIG. 11, the conductive layers 25 and 27 each include an oxide semiconductor containing the same metal as the semiconductor layer and the conductive layer 223 of the transistor.

The above is the description of Cross-sectional Structural Example 2.

Modification Example

Figure 12:
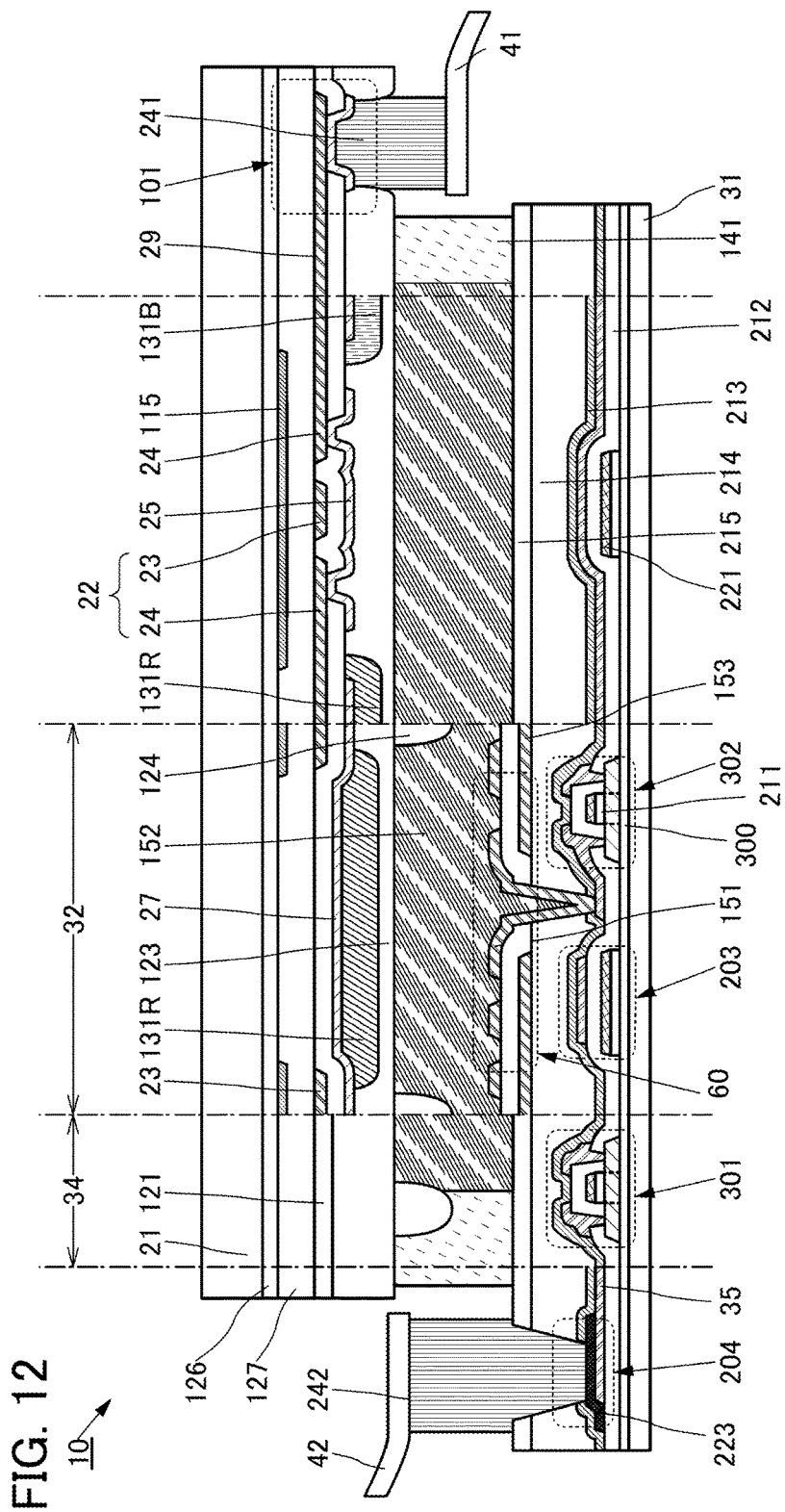
FIG. 12 shows a structure example of a touch panel module of an embodiment.
Figure 13:
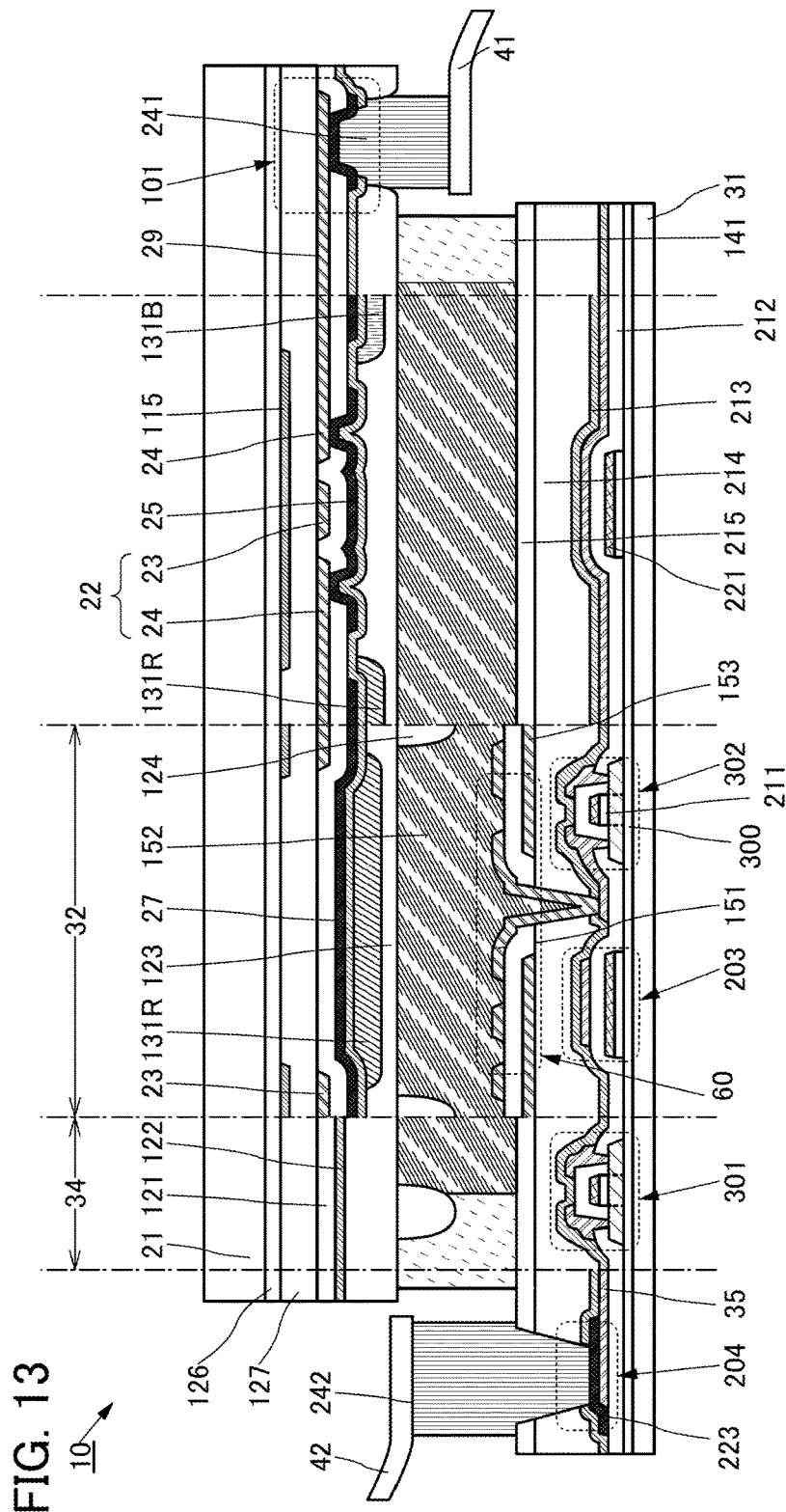
FIG. 13 shows a structure example of a touch panel module of an embodiment.

FIG. 12 and FIG. 13 each illustrate an example of a touch panel of one embodiment of the present invention that includes a top-gate transistor.

A touch panel module in FIG. 12 is different from that in FIG. 2 mainly in structures of the transistors 301 and 302. Since structures other than the transistor structures are almost the same as those in FIG. 2, the same portions are denoted by the same reference numerals and detailed descriptions of common portions are omitted.

A touch panel module in FIG. 13 shows an example where a top-gate transistor is used in the structure illustrated in FIG. 7.

FIG. 12 and FIG. 13 each illustrate an example where the display element 60 is a liquid crystal element using an FFS mode. The display element 60 includes the conductive layer 151, the liquid crystal 152, and the conductive layer 153.

The transistors 301 and 302 each include a semiconductor layer over a buffer layer 300, an insulating layer functioning as a gate insulating layer, a conductive layer functioning as a gate electrode and overlapping with the semiconductor layer with the gate insulating layer provided therebetween, an insulating layer covering the conductive layer functioning as the gate electrode, a conductive layer functioning as a source electrode, and a conductive layer functioning as a drain electrode. A region of the semiconductor layer which does not overlap with the gate electrode preferably has lower resistance than a channel formation region overlapping with the gate electrode.

In the case of using an oxide semiconductor layer, an impurity element (a rare gas, nitrogen, phosphorus, boron, hydrogen, or the like) is preferably added to a semiconductor layer not overlapping with the gate electrode so that the region of the semiconductor layer not overlapping with the gate electrode has lower resistance than the channel formation region. Helium, argon, or the like can be used as the rare gas. To add impurities, a method using plasma, an ion implantation method, or the like can be used. An ion implantation method is preferable because impurity elements can be added using the gate electrode as a mask to reduce the resistance of part of the oxide semiconductor layer.

The capacitor 203 includes the conductive layer functioning as the gate electrode, the conductive layer functioning as the source electrode or the drain electrode, and an insulating layer provided therebetween as a dielectric. The connection portion 204 is formed by stacking part of the wiring 35 and the conductive layer 223. The conductive layer 223 is formed by a sputtering method in an atmosphere containing an oxygen gas, and thus, oxygen or excess oxygen is added to the insulating layer 212 over which the conductive layer 223 is formed. Furthermore, excess oxygen fills oxygen vacancies in the oxide semiconductor layers in the transistors 301 and 302; thus, a highly reliable transistor can be provided. In the case where excess oxygen is supplied to the insulating layer 212 and/or the oxide semiconductor layer, the insulating layer 213 is preferably formed using a material capable of suppressing penetration of oxygen.

The buffer layer 300 is formed using an insulating material such as silicon oxide or metal oxide. As the metal oxide used for the buffer layer 300, an oxide containing one or more of aluminum, indium, gallium, zinc, and the like is used. For the buffer layer 300, a material through which impurities such as water and hydrogen are hardly diffused is preferably used. In other words, the buffer layer 300 can function as a barrier film. Such a structure can effectively suppress diffusion of the impurities into the transistors 301 and 302 from the outside, and thus, a highly reliable touch panel can be provided.

The above is the description of the modification examples.

[Components]

The above-mentioned components are described below.

[Substrate]

A substrate having a flat surface can be used as the substrate included in the touch panel. The substrate on the side from which light from the display element is extracted is formed using a material that transmits the light. For example, a material such as glass, quartz, ceramics, sapphire, or an organic resin can be used.

The weight and thickness of the touch panel can be decreased by using a thin substrate. A flexible touch panel can be obtained by using a substrate that is thin enough to have flexibility.

As the glass, for example, non-alkali glass, barium borosilicate glass, aluminoborosilicate glass, or the like can be used.

Examples of a material that has flexibility and transmits visible light include flexible glass, polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, a polyvinyl chloride resin, and a polytetrafluoroethylene (PTFE). In particular, a material whose thermal expansion coefficient is low is preferable, and for example, a polyamide imide resin, a polyimide resin, or PET can be suitably used. A substrate in which a glass fiber is impregnated with an organic resin or a substrate whose thermal expansion coefficient is reduced by mixing an organic resin with an inorganic filler can also be used. A substrate using such a material is lightweight, and accordingly a touch panel using this substrate can also be lightweight.

Since it is not necessary for the substrate through which light emission is not extracted to have a light-transmitting property, a metal substrate, a ceramic substrate, a semiconductor substrate, or the like can be used as well as the above-described substrates. A metal material and an alloy material, which have high thermal conductivity, is preferable because they can easily conduct heat to the whole sealing substrate and accordingly can prevent a local temperature rise in the touch panel. To obtain flexibility and bendability, the thickness of a metal substrate is preferably greater than or equal to 10 μm and less than or equal to 200 μm, more preferably greater than or equal to 20 μm and less than or equal to 50 μm.

Although there is no particular limitation on a material of a metal substrate, it is favorable to use, for example, a metal such as aluminum, copper, and nickel, an aluminum alloy, or an alloy such as stainless steel.

It is preferable to use a substrate subjected to insulation treatment, e.g., a metal substrate whose surface is oxidized or provided with an insulating film. An insulating film may be formed by, for example, a coating method such as a spin-coating method and a dipping method, an electrodeposition method, an evaporation method, or a sputtering method. An oxide film may be formed over the substrate surface by an anodic oxidation method, exposing to or heating in an oxygen atmosphere, or the like.

A hard coat layer (e.g., a silicon nitride layer) by which a touch panel surface is protected from damage, a layer (e.g., an aramid resin layer) that can disperse pressure, or the like may be stacked over the flexible substrate. Furthermore, to suppress a decrease in lifetime of the display element due to moisture and the like, an insulating film with low water permeability may be stacked over the flexible substrate. For example, an inorganic insulating material such as silicon nitride, silicon oxynitride, aluminum oxide, or aluminum nitride can be used.

The substrate may be formed by stacking a plurality of layers. When a glass layer is used, a barrier property against water and oxygen can be improved and thus a highly reliable touch panel can be provided.

A substrate in which a glass layer, an adhesive layer, and an organic resin layer are stacked from the side closer to the display element can be used, for example. The thickness of the glass layer is greater than or equal to 20 μm and less than or equal to 200 μm, preferably greater than or equal to 25 μm and less than or equal to 100 μm. With such a thickness, the glass layer can have both a high barrier property against water and oxygen and a high flexibility. The thickness of the organic resin layer is greater than or equal to 10 μm and less than or equal to 200 μm, preferably greater than or equal to 20 μm and less than or equal to 50 μm. Providing such an organic resin layer, occurrence of a crack or a break in the glass layer can be suppressed and mechanical strength can be improved. With the substrate that includes such a composite material of a glass material and an organic resin, a highly reliable flexible touch panel can be provided.

[Transistor]

The transistor includes a conductive layer functioning as the gate electrode, the semiconductor layer, a conductive layer functioning as the source electrode, a conductive layer functioning as the drain electrode, and an insulating layer functioning as the gate insulating layer. The above description is that of the case where a bottom-gate transistor is used.

Note that there is no particular limitation on the structure of the transistor included in the touch panel of one embodiment of the present invention. For example, a forward staggered transistor or an inverted staggered transistor may be used. A top-gate transistor or a bottom-gate transistor may be used. There is no particular limitation on a semiconductor material that is used for the transistor, and for example, an oxide semiconductor, silicon, or germanium can be used.

There is no particular limitation on the crystallinity of a semiconductor material used for the transistors, and an amorphous semiconductor or a semiconductor having crystallinity (a microcrystalline semiconductor, a polycrystalline semiconductor, a single-crystal semiconductor, or a semiconductor partly including crystal regions) may be used. It is preferable that a semiconductor having crystallinity be used, in which case deterioration of the transistor characteristics can be suppressed.

As a semiconductor material for the semiconductor layer of the transistor, an element of Group 14, a compound semiconductor, or an oxide semiconductor can be used, for example. Typically, a semiconductor containing silicon, a semiconductor containing gallium arsenide, an oxide semiconductor containing indium, or the like can be used.

In particular, an oxide semiconductor having a wider band gap than silicon is preferably used. A semiconductor material having a wider band gap and a lower carrier density than silicon is preferably used because off-state leakage current of the transistor can be reduced.

For example, at least indium (In) or zinc (Zn) is preferably included as the oxide semiconductor. More preferably, an In-M-Zn oxide (M is a metal such as Al, Ti, Ga, Ge, Y, Zr, Sn, La, Ce, Hf, or Nd) is included.

As the semiconductor layer, it is particularly preferable to use an oxide semiconductor film including a plurality of crystal parts whose c-axes are aligned substantially perpendicular to a surface on which the semiconductor layer is formed or the top surface of the semiconductor layer and in which a grain boundary is not observed between adjacent crystal parts.

There is no grain boundary in such an oxide semiconductor; therefore, generation of a crack in an oxide semiconductor film which is caused by stress when a display panel is bent is prevented. Therefore, such an oxide semiconductor can be preferably used for a flexible touch panel which is used in a bent state, or the like.

Moreover, the use of such an oxide semiconductor with crystallinity for the semiconductor layer makes it possible to provide a highly reliable transistor in which a change in the electrical characteristics is suppressed.

A transistor with an oxide semiconductor whose band gap is larger than the band gap of silicon can hold charges stored in a capacitor that is series-connected to the transistor for a long time, owing to the low off-state current of the transistor. When such a transistor is used for a pixel, operation of a driver circuit can be stopped while a gray scale of an image displayed in each display region is maintained. As a result, a display device with extremely low power consumption can be obtained.

The semiconductor layer preferably includes, for example, a film represented by an In-M-Zn oxide that contains at least indium, zinc, and M (a metal such as Al, Ti, Ga, Y, Zr, La, Ce, Sn, or Hf). In order to reduce variations in electrical characteristics of the transistor including the oxide semiconductor, the oxide semiconductor preferably contains a stabilizer in addition to indium, zinc, and M.

Examples of the stabilizer, including metals that can be used as M, are gallium, tin, hafnium, aluminum, and zirconium. As another stabilizer, lanthanoid such as lanthanum, cerium, praseodymium, neodymium, samarium, europium, gadolinium, terbium, dysprosium, holmium, erbium, thulium, ytterbium, or lutetium can be given.

As an oxide semiconductor included in the semiconductor layer, any of the following can be used, for example: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

Note that here, for example, an "In—Ga—Zn-based oxide" means an oxide containing In, Ga, and Zn as its main components, and there is no limitation on the ratio of In:Ga:Zn. The In—Ga—Zn-based oxide may contain another metal element in addition to In, Ga, and Zn.

The semiconductor layer and the conductive layer may include the same metal elements contained in the above oxides. The use of the same metal elements for the semiconductor layer and the conductive layer can reduce the manufacturing cost. For example, when metal oxide targets with the same metal composition are used, the manufacturing cost can be reduced, and the same etching gas or the same etchant can be used in processing the semiconductor layer and the conductive layer. Note that even when the semiconductor layer and the conductive layer include the same metal elements, they have different compositions in some cases. For example, a metal element in a film is released during the manufacturing process of the transistor and the capacitor, which might result in different metal compositions.

In the case where the semiconductor layer is an In-M-Zn oxide, when Zn and O are eliminated from consideration, the proportions of In and M when the summation of In and M is assumed to be 100 atomic % are preferably as follows: the atomic percentage of In is higher than 25 atomic % and the atomic percentage of M is lower than 75 atomic %, more preferably, the atomic percentage of In is higher than 34 atomic % and the atomic percentage of M is lower than 66 atomic %.

The energy gap of the semiconductor layer is 2 eV or more, preferably 2.5 eV or more, more preferably 3 eV or more. With the use of an oxide semiconductor having such a wide energy gap, the off-state current of the transistor can be reduced.

The thickness of the semiconductor layer is greater than or equal to 3 nm and less than or equal to 200 nm, preferably greater than or equal to 3 nm and less than or equal to 100 nm, more preferably greater than or equal to 3 nm and less than or equal to 50 nm.

In the case where the semiconductor layer contains an In-M-Zn oxide (M represents Al, Ti, Ga, Ge, Y, Zr, Sn, La, Ce, Hf, or Nd), it is preferable that the atomic ratio of metal elements of a sputtering target used for forming a film of the In-M-Zn oxide satisfy In≥M and Zn≥M. As the atomic ratio of metal elements of such a sputtering target, In:M:Zn=1:1:1, In:M:Zn=1:1:1.2, and In:M:Zn=3:1:2 are preferable. Note that the atomic ratio of metal elements in the formed semiconductor layer varies from the above atomic ratio of metal elements of the sputtering target within a range of ±40% as an error.

An oxide semiconductor film with low carrier density is used as the semiconductor layer. For example, the semiconductor layer is an oxide semiconductor with low carrier density (specifically, lower than or equal to $1\times10^{17}/cm^3$, preferably lower than or equal to $1\times10^{15}/cm^3$, more preferably lower than or equal to $1\times10^{13}/cm^3$, still more preferably lower than or equal to $1\times10^{11}/cm^3$, even more preferably lower than $1\times10^{10}/cm^3$, and higher than or equal to $1\times10^{-9}/cm^3$). Such an oxide semiconductor is referred to as a highly purified intrinsic or substantially highly purified intrinsic oxide semiconductor. The oxide semiconductor has low impurity concentration and a low density of defect states and can thus be referred to as an oxide semiconductor having stable characteristics.

Note that, without limitation to those described above, a material with an appropriate composition may be used depending on required semiconductor characteristics and electrical characteristics (e.g., field-effect mobility and threshold voltage) of a transistor. To obtain the required semiconductor characteristics of the transistor, it is preferable that the carrier density, the impurity concentration, the defect density, the atomic ratio between a metal element and oxygen, the interatomic distance, the density, and the like of the semiconductor layer be set to appropriate values.

When silicon or carbon that is one of elements belonging to Group 14 is contained in the semiconductor layer, oxygen vacancies are increased in the semiconductor layer, and the semiconductor layer becomes n-type. Thus, the concentration of silicon or carbon (measured by secondary ion mass spectrometry (SIMS)) in the semiconductor layer is lower than or equal to $2\times10^{18}$ atoms/cm$^3$, preferably lower than or equal to $2\times10^{17}$ atoms/cm$^3$.

An alkali metal and an alkaline earth metal might generate carriers when bonded to an oxide semiconductor, in which case the off-state current of the transistor might be increased. Therefore, the concentration of alkali metal or alkaline earth metal of the semiconductor layer, which is measured by SIMS, is lower than or equal to $1\times10^{18}$ atoms/cm$^3$, preferably lower than or equal to $2\times10^{16}$ atoms/cm$^3$.

When nitrogen is contained in the semiconductor layer, electrons serving as carriers are generated and the carrier density increases, so that the semiconductor layer easily becomes n-type. Thus, a transistor including an oxide semiconductor which contains nitrogen is likely to be normally on. For this reason, the concentration of nitrogen which is measured by SIMS is preferably set to, for example, lower than or equal to $5\times10^{18}$ atoms/cm$^3$.

The semiconductor layer may have, for example, a non-single crystal structure. Examples of the non-single crystal structure include a c-axis aligned crystalline oxide semiconductor (CAAC-OS), a polycrystalline structure, a microrystalline structure, and an amorphous structure. Among the non-single crystal structures, the amorphous structure has the highest density of defect states, whereas CAAC-OS has the lowest density of defect states.

The semiconductor layer may have an amorphous structure, for example. The oxide semiconductor film having an amorphous structure has disordered atomic arrangement and no crystalline component, for example. Alternatively, the oxide film having an amorphous structure has, for example, an absolutely amorphous structure and no crystal part.

Note that the semiconductor layer may be a mixed film including two or more of the following: a region having an amorphous structure, a region having a microcrystalline structure, a region having a polycrystalline structure, a CAAC-OS region, and a region having a single-crystal structure. The mixed film includes, for example, two or more of a region having an amorphous structure, a region having a microcrystalline structure, a region having a polycrystalline structure, a CAAC-OS region, and a region having a single-crystal structure in some cases. The mixed film may have a stacked-layer structure of two or more of the following: a region having an amorphous structure, a region having a microcrystalline structure, a region having a polycrystalline structure, a CAAC-OS region, and a region having a single-crystal structure.

Alternatively, silicon is preferably used as a semiconductor in which a channel of a transistor is formed. Although amorphous silicon may be used as silicon, silicon having crystallinity is particularly preferable. For example, microcrystalline silicon, polycrystalline silicon, single-crystal silicon, or the like is preferably used. In particular, polycrystalline silicon can be formed at a lower temperature than single-crystal silicon and has higher field effect mobility and higher reliability than amorphous silicon. When such a polycrystalline semiconductor is used for a pixel, the aperture ratio of the pixel can be improved. Even in the case of a high-definition display panel, a gate driver circuit and a source driver circuit can be formed over a substrate over which the pixels are formed, and the number of components of an electronic device can be reduced.

[Conductive Layer]

As a gate, a source, and a drain of a transistor, and a wiring or an electrode included in a touch panel, any of metals such as aluminum, titanium, chromium, nickel, copper, yttrium, zirconium, molybdenum, silver, tantalum, and tungsten, or an alloy containing any of these metals as its main component can be used. A single-layer structure or multi-layer structure including a film containing any of these materials can be used. For example, the following structures can be given: a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film, an aluminum film or a copper film, and a titanium film or a titanium nitride film are stacked in this order, and a three-layer structure in which a molybdenum film or a molybdenum nitride film, an aluminum film or a copper film, and a molybdenum film or a molybdenum nitride film are stacked in this order. Note that an oxide such as indium oxide, tin oxide, or zinc oxide may be used. Copper containing manganese is preferably used because controllability of a shape by etching is increased.

As a light-transmitting conductive material, a conductive oxide such as indium oxide, indium tin oxide, indium zinc oxide, zinc oxide, or zinc oxide to which gallium is added, or graphene can be used. Alternatively, a metal material such as gold, silver, platinum, magnesium, nickel, tungsten, chromium, molybdenum, iron, cobalt, copper, palladium, or titanium, or an alloy material containing any of these metal materials can be used. Alternatively, a nitride of the metal material (e.g., titanium nitride) or the like may be used. In the case of using the metal material or the alloy material (or the nitride thereof), the thickness is set small enough to be able to transmit light. Alternatively, a stack of any of the above materials can be used as the conductive layer. For example, a stacked film of indium tin oxide and an alloy of silver and magnesium is preferably used because the conductivity can be increased.

Alternatively, for the conductive layer, an oxide semiconductor similar to that of the semiconductor layer is preferably used. In that case, it is preferable that the conductive layer be formed to have a lower electric resistance than a region in the semiconductor layer where a channel is formed.

For example, such a conductive layer can be used as the conductive layer 25, the conductive layer 27, the conductive layer 223 functioning as the second gate electrode of the transistor, or the like. Alternatively, it can be used as another light-transmitting conductive layer.

<Method for Controlling Resistivity of Oxide Semiconductor>

An oxide semiconductor film that can be used as each of the semiconductor layer and the conductive layer includes a semiconductor material whose resistivity can be controlled by oxygen vacancies in the film and/or the concentration of impurities such as hydrogen or water in the film. Thus, treatment to be performed on the semiconductor layer and the conductive layer is selected from the following to control the resistivity of each of the oxide semiconductor films: treatment for increasing oxygen vacancies and/or impurity concentration and treatment for reducing oxygen vacancies and/or impurity concentration.

Specifically, plasma treatment is performed on the oxide semiconductor film used as the conductive layer to increase oxygen vacancies and/or impurities such as hydrogen or water in the oxide semiconductor film, so that the oxide semiconductor film can have a high carrier density and low resistivity. Furthermore, an insulating film containing hydrogen is formed in contact with the oxide semiconductor film to diffuse hydrogen from the insulating film containing hydrogen to the oxide semiconductor film, so that the oxide semiconductor film can have a high carrier density and low resistivity.

The semiconductor layer that functions as the channel region of the transistor is not in contact with the insulating films containing hydrogen. With the use of an insulating film containing oxygen, in other words, an insulating film capable of releasing oxygen for at least one of the insulating films, oxygen can be supplied to the semiconductor layer. The semiconductor layer to which oxygen is supplied has high resistivity because oxygen vacancies in the film or at the interface are compensated. Note that as the insulating film capable of releasing oxygen, a silicon oxide film or a silicon oxynitride film can be used, for example.

In order to reduce the resistivity of the oxide semiconductor film, an ion implantation method, an ion doping method, a plasma immersion ion implantation method, or the like can be employed to inject hydrogen, boron, phosphorus, or nitrogen into the oxide semiconductor film.

In order to reduce the resistivity of the oxide semiconductor film, plasma treatment may be performed on the oxide semiconductor film. For the plasma treatment, a gas containing at least one of a rare gas (He, Ne, Ar, Kr, or Xe), hydrogen, and nitrogen is typically used. Specifically, plasma treatment in an Ar atmosphere, plasma treatment in a mixed gas atmosphere of Ar and hydrogen, plasma treatment in an ammonia atmosphere, plasma treatment in a mixed gas atmosphere of Ar and ammonia, plasma treatment in a nitrogen atmosphere, or the like can be employed.

In the oxide semiconductor film subjected to the plasma treatment, an oxygen vacancy is formed in a lattice from which oxygen is released (or in a portion from which oxygen is released). This oxygen vacancy can cause carrier generation. When hydrogen is supplied from an insulating film that is in the vicinity of the oxide semiconductor film (specifically, an insulating film that is in contact with the lower surface or the upper surface of the oxide semiconductor film), and hydrogen is bonded to the oxygen vacancy, an electron serving as a carrier might be generated.

The oxide semiconductor film in which oxygen vacancies are compensated with oxygen and the hydrogen concentration is reduced can be referred to as a highly purified intrinsic or substantially highly purified intrinsic oxide semiconductor film. Here, the term "substantially intrinsic" refers to a state where an oxide semiconductor film has a carrier density of lower than $8\times10^{11}/cm^3$, preferably lower than $1\times10^{11}/cm^3$, more preferably lower than $1\times10^{10}/cm^3$. A highly purified intrinsic or substantially highly purified intrinsic oxide semiconductor film has few carrier generation sources and can thus have a low carrier density. The highly purified intrinsic or substantially highly purified intrinsic oxide semiconductor film has a low density of defect states and can accordingly have a low density of trap states.

The highly purified intrinsic or substantially highly purified intrinsic oxide semiconductor film has an extremely low off-state current; even when an element has a channel width of $1\times10^6$ µm and a channel length of 10 µm, the off-state current can be lower than or equal to the measurement limit of a semiconductor parameter analyzer, i.e., lower than or equal to $1\times10^{-13}$ A, at a voltage (drain voltage) between a source electrode and a drain electrode ranging from 1 V to 10 V. Accordingly, the transistor in which the channel region is formed in the semiconductor layer that is a highly purified intrinsic or substantially highly purified intrinsic oxide semiconductor film can have a small variation in electrical characteristics and high reliability.

For example, an insulating film containing hydrogen, in other words, an insulating film capable of releasing hydrogen, typically, a silicon nitride film, is used as the insulating film in contact with the oxide semiconductor film used as the conductive layer, whereby hydrogen can be supplied to the conductive layer. The hydrogen concentration of the insulating film capable of releasing hydrogen is preferably higher than or equal to $1\times10^{22}$ atoms/cm$^3$. Such an insulating film is formed in contact with the conductive layer, whereby hydrogen can be effectively contained in the conductive layer. In this manner, the resistivity of the oxide semiconductor film can be controlled by changing the structure of insulating films in contact with the semiconductor layer and the conductive layer.

Hydrogen contained in the oxide semiconductor film reacts with oxygen bonded to a metal atom to be water, and in addition, an oxygen vacancy is formed in a lattice from which oxygen is released (or in a portion from which oxygen is released). Due to entry of hydrogen into the oxygen vacancy, an electron serving as a carrier is generated in some cases. Furthermore, bonding of part of hydrogen to oxygen bonded to a metal atom causes generation of an electron serving as a carrier in some cases. Accordingly, the conductive layer formed in contact with the insulating film containing hydrogen is an oxide semiconductor film that has a higher carrier density than the semiconductor layer.

In the semiconductor layer where the channel region of the transistor is formed, it is preferable to reduce hydrogen as much as possible. Specifically, in the semiconductor layer, the hydrogen concentration which is measured by SIMS is set to lower than or equal to $2\times10^{20}$ atoms/cm$^3$, preferably lower than or equal to $5\times10^{19}$ atoms/cm$^3$, more preferably lower than or equal to $1\times10^{19}$ atoms/cm$^3$, more preferably lower than $5\times10^{18}$ atoms/cm$^3$, more preferably lower than or equal to $1\times10^{18}$ atoms/cm$^3$, more preferably lower than or equal to $5\times10^{17}$ atoms/cm$^3$, more preferably lower than or equal to $1\times10^{16}$ atoms/cm$^3$.

The conductive layer is an oxide semiconductor film that has a higher hydrogen concentration and/or a larger number of oxygen vacancies (i.e., a lower resistivity) than the semiconductor layer. The hydrogen concentration in the conductive layer is higher than or equal to $8\times10^{19}$ atoms/cm$^3$, preferably higher than or equal to $1\times10^{20}$ atoms/cm$^3$, more preferably higher than or equal to $5\times10^{20}$ atoms/cm$^3$. The hydrogen concentration in the conductive layer is greater than or equal to 2 times, preferably greater than or equal to 10 times the hydrogen concentration in the semiconductor layer. The resistivity of the conductive layer is preferably greater than or equal to $1\times10^{-8}$ times and less than $1\times10^{-1}$ times the resistivity of the semiconductor layer. The resistivity of the conductive layer is typically higher than or equal to $1\times10^{-3}$ Ωcm and lower than $1\times10^{4}$ Ωcm, preferably higher than or equal to $1\times10^{-3}$ Ωcm and lower than $1\times10^{-1}$ Ωcm.

[Insulating Layer]

Examples of an insulating material that can be used for the insulating layers, the overcoat, the spacer, and the like include a resin such as acrylic or epoxy resin, a resin having a siloxane bond, and an inorganic insulating material such as silicon oxide, silicon oxynitride, silicon nitride oxide, silicon nitride, or aluminum oxide.

[Adhesive Layer]

For the adhesive layers, a curable resin such as a heat curable resin, a photocurable resin, or a two-component type curable resin can be used. For example, an acrylic resin, a urethane resin, an epoxy resin, or a resin having a siloxane bond such as silicone can be used.

[Connection Layer]

As the connection layers, an anisotropic conductive film (ACF), an anisotropic conductive paste (ACP), or the like can be used.

[Coloring Layer]

As examples of a material that can be used for the coloring layers, a metal material, a resin material, and a resin material containing a pigment or dye can be given.

The above is the description of each of the components.

[Structural Example of Touch Sensor]

Next, a structure example of the touch sensor 22 which can be used for the touch panel module 10 of one embodiment of the present invention is described with reference to drawings.

Figure 14A:
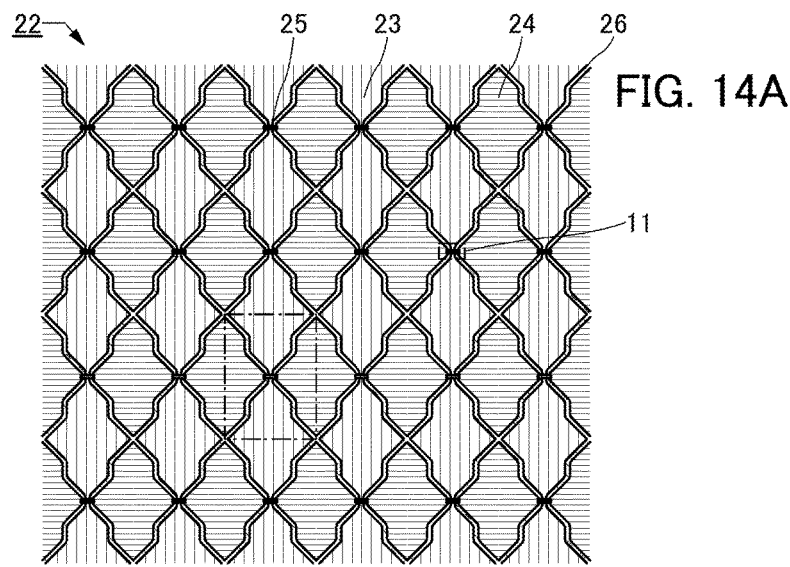
FIGS. 14A to 14C show structure examples of a touch sensor of an embodiment.
Figure 14B:
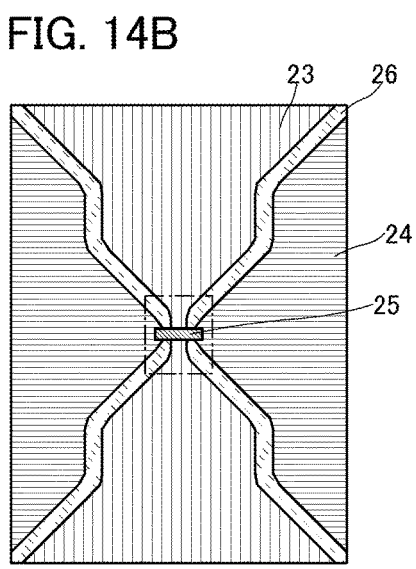

FIG. 14A is a schematic top view (schematic plan view) of part of the touch sensor 22. FIG. 14B is an enlarged schematic top view of a region surrounded by dashed-dotted line in FIG. 14A.

As shown in FIGS. 14A and 14B, it is preferable that the conductive layer 23 be partly narrowed so that the width of a portion crossing the conductive layer 25 is small. Thus, the capacitance of the capacitor 11 can be reduced. In the case of using a self-capacitive touch sensor, the detection sensitivity can be increased more as the capacitance of the capacitor 11 is smaller.

Furthermore, between the conductive layer 23 and the conductive layer 24 which are adjacent to each other, a conductive layer 26 which is electrically insulated from these conductive layers 23 and 24 may be provided. The conductive layer 26 can suppress the formation of a thin portion of the touch sensor 22. For example, in the case where the conductive layer 23 and the conductive layer 24 are formed over the same flat surface, the conductive layer 26 formed in a manner similar to that of the conductive layer 23 and the conductive layer 24 can increase coverage of a thin film formed after the formation of these conductive layers; thus, a surface can be planarized. Furthermore, owing to the uniform thickness of the touch sensor 22, luminance unevenness of light emitted from the pixels through the touch sensor 22 can be reduced, so that the touch panel can achieve high display quality.

Figure 14C:
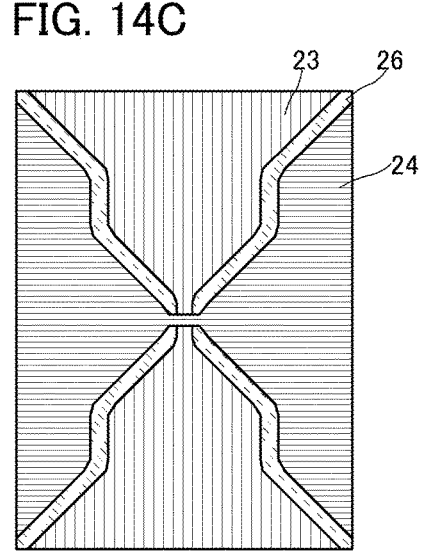

FIG. 14C shows the case where the conductive layer 23 and the conductive layer 24 are formed over different flat surfaces and the conductive layer 25 is not provided. At this time, the conductive layer 26 may be formed over the flat surface over which the conductive layer 23 or the conductive layer 24 is formed, or may be formed over a flat surface different from the flat surface over which the conductive layer 23 or the conductive layer 24 is formed. Note that the conductive layer 26 is not necessarily provided if not necessary.

Figure 15A:
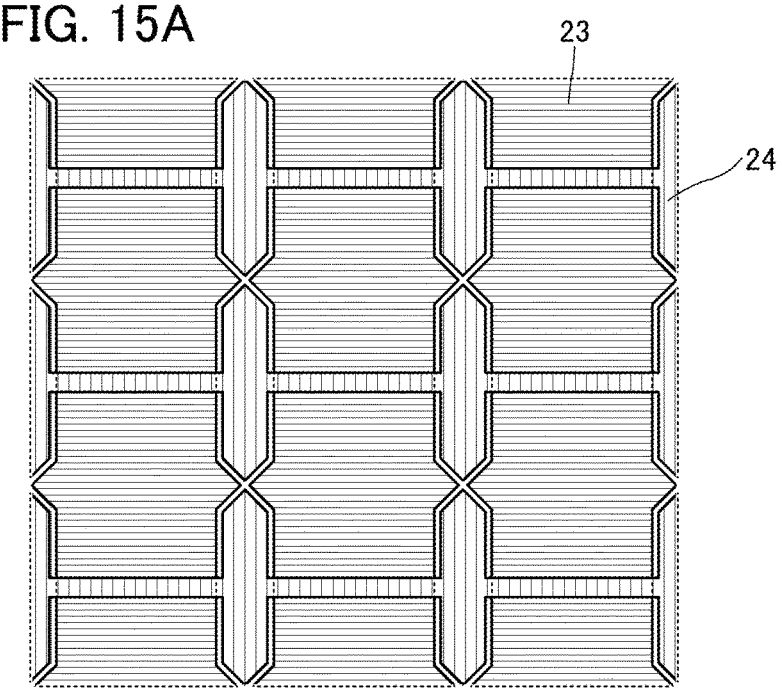
FIGS. 15A and 15B show structure examples of a touch sensor of an embodiment.

FIG. 15A is a schematic top view of part of a touch sensor having a pattern different from those in FIGS. 14A to 14C.

In the example illustrated in FIG. 15A, the conductive layer 23 is wider than the conductive layer 24 in an intersection of the conductive layers 23 and 24.

Figure 15B:
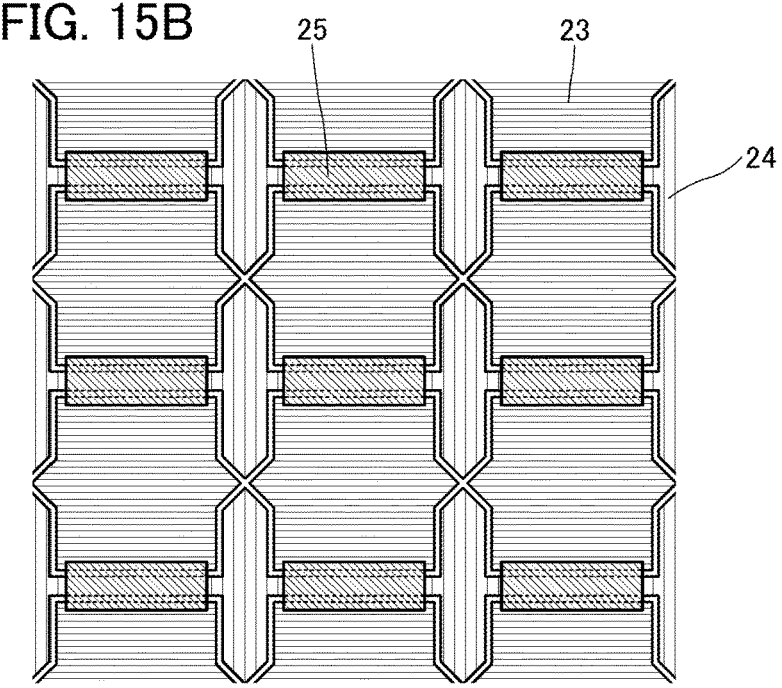

In the case where the conductive layers 23 are arranged in parallel to each other in the long-side direction of the display portion and the conductive layers 24 are arranged in parallel to each other in the short-side direction, for example, it is particularly effective to make the conductive layer 23 wider than the conductive layer 24 as illustrated in FIGS. 15A and 15B to prevent an increase in resistance of the conductive layer 23.

FIG. 15B illustrates an example where the conductive layer 25 electrically connected to the conductive layer 23 is provided. In the case where a bridge is made by the conductive layer 25 in this manner, contact resistance between the conductive layer 23 and the conductive layer 25 affects the detection sensitivity in some cases. For that reason, it is more effective to set the width of the conductive layer having a bridge structure larger. In that case, the conductive layers 23 may be conductive layers provided in parallel to each other in the short-side direction of the display portion.

Figure 16A:
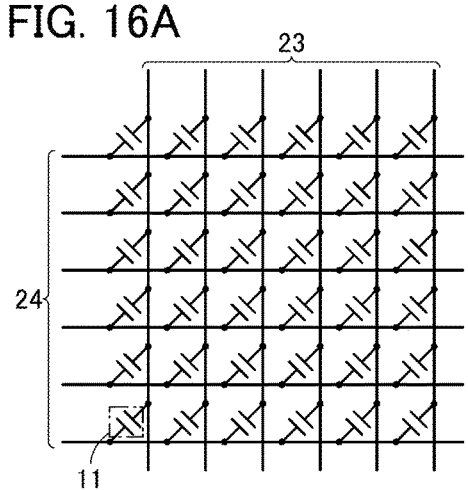
FIGS. 16A to 16C show structure examples of a touch sensor of an embodiment.

FIG. 16A shows an example of a circuit diagram of the touch sensor 22 including a plurality of conductive layers 23 and a plurality of conductive layers 24. In FIG. 16A, six conductive layers 23 and six conductive layers 24 are shown for simplicity, but the number of the conductive layers 23 and the number of the conductive layers 24 are not limited thereto.

One capacitor 11 is formed between one of the conductive layers 23 and one of the conductive layers 24. Therefore, capacitors 11 are arranged in a matrix.

In the case of a projected self-capacitive type, a pulse voltage is applied to each of the conductive layers 23 and 24 so that the conductive layers 23 and 24 are scanned, and the value of a current flowing in the conductive layer 23 or the conductive layer 24 at this time is sensed. The amount of current is changed when an object approaches, and therefore, positional information of the object can be obtained by sensing the difference between the values. In the case of a projected mutual-capacitive type, a pulse voltage is applied to one of the conductive layers 23 and 24 so that one of the conductive layers 23 and 24 is scanned, and a current flowing in the other is sensed to obtain positional information of the object.

Figure 16B:
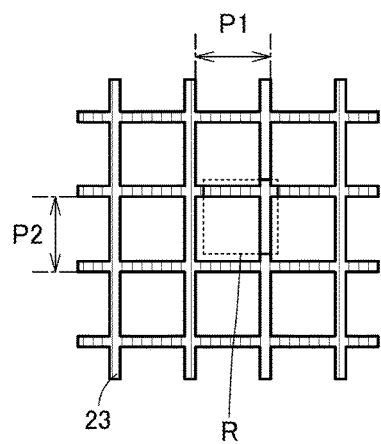

Each of the conductive layers 23 and 24 preferably has a lattice shape or a mesh shape having a plurality of openings. FIG. 16B shows an example of a top surface shape of part of the conductive layer 23.

Figure 16C:
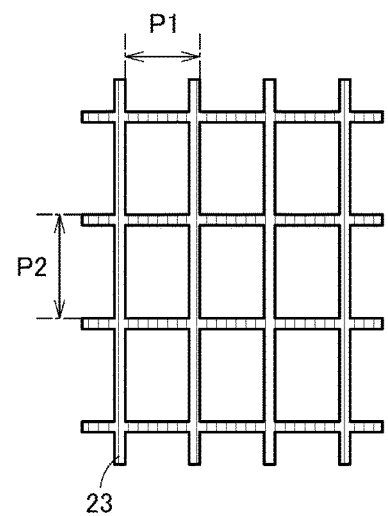

The conductive layer 23 shown in FIG. 16B has a lattice shape in which a distance P1 is provided in a lateral direction and a distance P2 is provided in a longitudinal direction. The distance P1 and the distance P2 are almost the same in FIG. 16B, but may be different from each other. For example, the distance P2 in a longitudinal direction may be larger than the distance P1 in a lateral direction as shown in FIG. 16C, or the distance P2 in a longitudinal direction may be smaller than the distance P1 in a lateral direction. The same can be said for the conductive layer 24.

The aperture ratio of the conductive layer 23 or the conductive layer 24 (the proportion of the opening area in the conductive layer 23 or the conductive layer 24 per unit area) is preferably higher than or equal to 20% and lower than 100%, more preferably higher than or equal to 30% and lower than 100%, still more preferably higher than or equal to 50% and lower than 100% in a region.

The aperture ratio can be easily calculated from the distance P1, the distance P2, and the width of the conductive layer. Alternatively, when a region R is assumed to be a periodic unit in FIG. 16B, the aperture ratio can be calculated from the ratio of the area of the region R to the area of the conductive layer 23 included in the region R. Here, the region R is a periodic unit of a periodic pattern of the conductive layer 23. By arranging regions R longitudinally and laterally in a periodic manner, the pattern of the conductive layer 23 can be formed.

In each of the conductive layer 23 and the conductive layer 24, the line width of a lattice is preferably greater than or equal to 50 nm and less than or equal to 100 μm, more preferably greater than or equal to 1 μm and less than or equal to 50 μm, still more preferably greater than or equal to 1 μm and less than or equal to 20 μm. The lattice having such a narrow line width allows adjacent pixels to be close to each other in the case where the opening overlaps with the pixel as described later. Consequently, the touch panel can have higher resolution and higher aperture ratio.

Figure 17A:
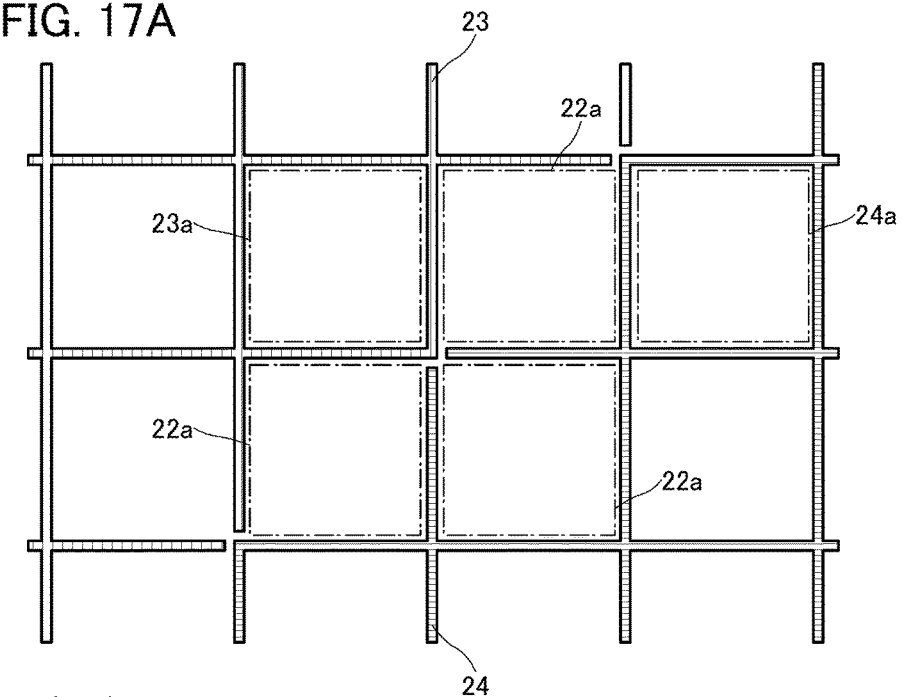
FIGS. 17A and 17B show structure examples of a touch sensor of an embodiment.

FIG. 17A is an enlarged schematic top view of a boundary portion between the conductive layer 23 and the conductive layer 24.

Each of the conductive layers 23 and 24 preferably has a lattice shape (also referred to as a mesh shape). That is, each of the conductive layers 23 and 24 preferably has a plurality of openings (an opening 23a and an opening 24a). When the opening and the pixel are provided to overlap with each other as described later, light emitted from the display element in the pixel is not blocked by the conductive layer 23 and the conductive layer 24, or a reduction in the luminance of light due to the transmission through the conductive layer 23 and the conductive layer 24 does not occur. As a result, the touch sensor 22 can be used in the touch panel without a reduction in the aperture ratio of the pixel and the light extraction efficiency. It is preferable that the conductive layer 25 similarly have a shape not overlapping with the pixel.

As shown in FIG. 17A, an opening 22a surrounded by part of the conductive layer 23 and part of the conductive layer 24 may be formed in the boundary portion. Such a structure can significantly reduce the distance between the conductive layer 23 and the conductive layer 24 and can increase capacitance therebetween. In particular, in the case of using a mutual capacitive type, the distance between the two conductive layers is preferably reduced to increase capacitance therebetween.

Figure 17B:
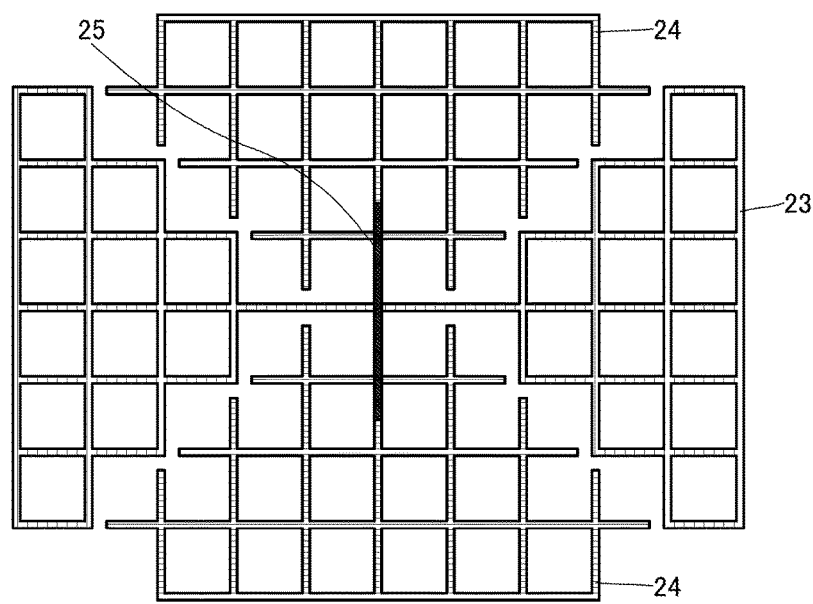

FIG. 17B is an enlarged schematic top view of an intersection of the conductive layers 23 and 24. An example where the two adjacent conductive layers 24 are electrically connected to each other with the conductive layer 25 is shown here. Although not illustrated in the drawing, the insulating layer 121 is provided between the conductive layer 25 and the conductive layers 23 and 24. The conductive layers 24 and 25 are electrically connected to each other through an opening provided in the insulating layer 121. The conductive layers 23 and 25 partly overlap with each other with the insulating layer 121 provided therebetween.

Figure 18A:
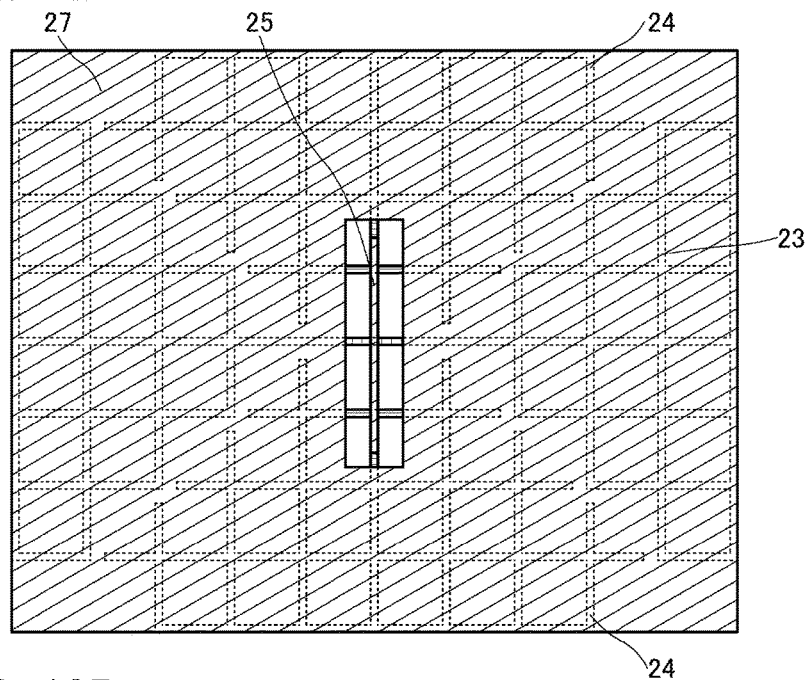
FIGS. 18A and 18B show a structure example of a touch sensor of an embodiment.
Figure 18B:
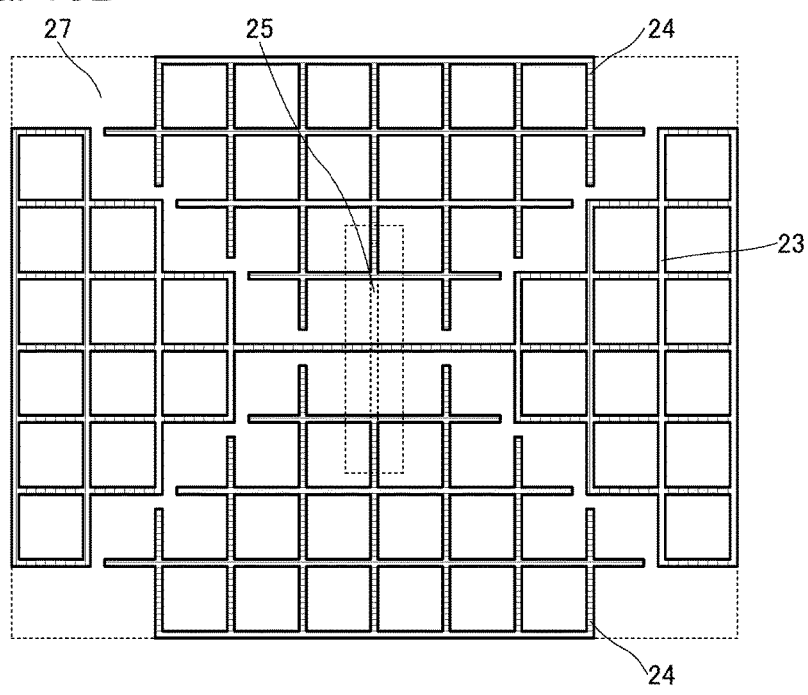

FIG. 18A is a diagram where the conductive layer 27 is overlapped in the structure in FIG. 17B. In FIG. 18B, the conductive layers 27 and 25 are denoted by broken lines in that case.

As described above, an opening (also referred to as a gap) can be provided in the conductive layer 27 and the conductive layer 25 can be provided in the opening. Thus, the conductive layers 27 and 25 can be formed by processing the same conductive film.

Note that in the case where the conductive layers 27 and 25 are formed by processing different conductive films, the conductive layer 27 and the conductive layer 25 may overlap with each other.

Figure 19A:
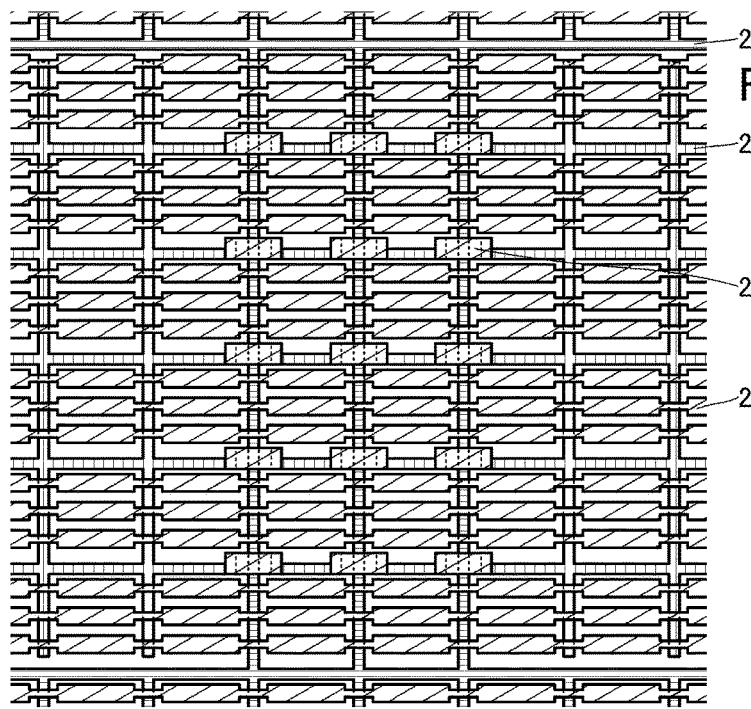
FIGS. 19A and 19B show a structure example of a touch sensor of an embodiment.
Figure 19B:
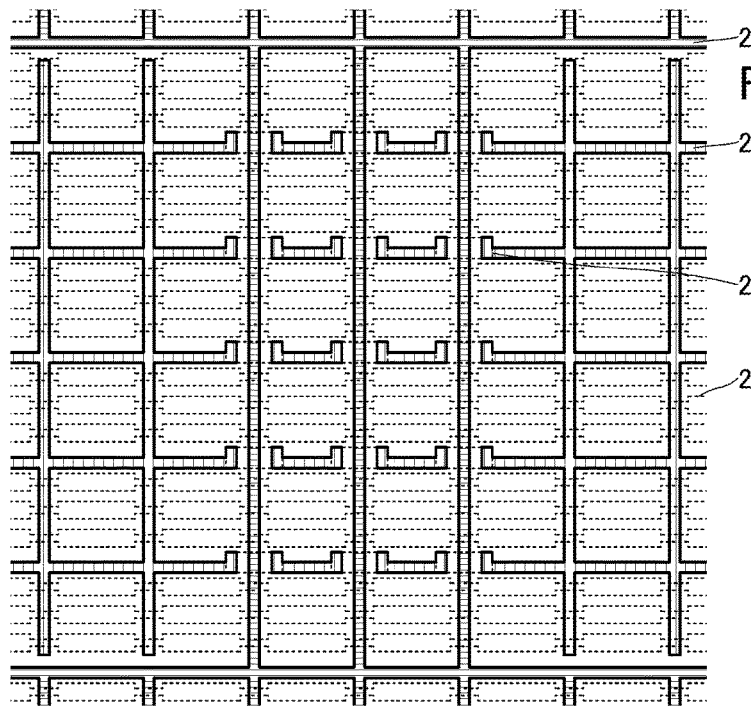

FIG. 19A shows an example of a pattern different from those in FIGS. 17A and 17B and FIGS. 18A and 18B. FIG. 19A is a schematic top view of the vicinity of an intersection of the conductive layers 23 and 24. The conductive layers 24 are bridged with the conductive layers 25. In FIG. 19B, the conductive layer 25 and the conductive layer 27 are denoted by broken lines.

FIGS. 19A and 19B show an example where a plurality of stripe-shaped conductive layers 27 are provided in the extending direction of the conductive layer 24. A structure where the plurality of conductive layers 27 are electrically connected to each other in the peripheral portion of the display portion (e.g., a portion overlapping with the circuit 34) and can be supplied with the same potential is preferable. The conductive layer 27 has a constricted shape in which a portion overlapping with a display element is wide and a portion overlapping with the conductive layer 23 is narrow. When the area where the conductive layers 27 and 23 overlap with each other is made small, parasitic capacitance of the conductive layer 23 can be reduced.

[Arrangement Example of Opening of Conductive Layer and Pixel]

FIGS. 20A to 20G are schematic views each showing the positional relationship between a pixel, sub-pixels included in the pixel, and the conductive layer 23 which are seen from the display surface side. Note that although the conductive layer 23 is shown in FIGS. 20A to 20G as an example, the same applies to the conductive layer 24 and the conductive layer 25.

Figure 20A:
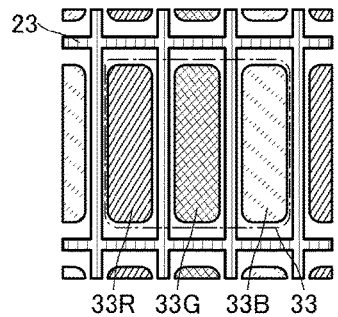
FIGS. 20A to 20G show structure examples of a touch panel of an embodiment.

In the example shown in FIG. 20A, the pixel 33 includes a sub-pixel 33R, a sub-pixel 33G, and a sub-pixel 33B. For example, the sub-pixel 33R, the sub-pixel 33G, and the sub-pixel 33B have a function of expressing red color, green color, and blue color, respectively. Note that the number and the colors of the sub-pixels included in the pixel 33 are not limited thereto.

The sub-pixels included in the pixel 33 each have a display element. The above-described liquid crystal element can be used as the display element. Besides the above-described liquid crystal element, examples of the display element include light-emitting elements such as organic EL elements; transmissive, semi-transmissive, or reflective liquid crystal elements; display elements (electronic ink) that perform display by an electrophoretic method, an electronic liquid powder (registered trademark) method, or the like; MEMS shutter display elements; and optical interference type MEMS display elements. The sub-pixel may have a transistor, a capacitor, a wiring that electrically connects the transistor and the capacitor, and the like in addition to the display element.

In the structure shown in FIG. 20A, each of a plurality of openings in the conductive layer 23 is provided to overlap with any one of the three sub-pixels, i.e., the sub-pixel 33R, the sub-pixel 33G, and the sub-pixel 33B. In this manner, the opening in the conductive layer 23 is preferably provided to overlap with one sub-pixel.

Figure 20B:
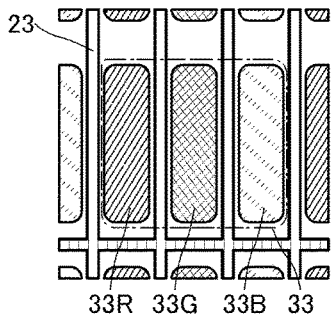

FIG. 20B illustrates a structure where the conductive layer 23 is provided between two adjacent sub-pixels exhibiting different colors. Since color mixture does not occur between two adjacent sub-pixels exhibiting the same color, a structure including a portion where the conductive layer 23 is not provided therebetween as illustrated in FIG. 20B may be employed.

Figure 20C:
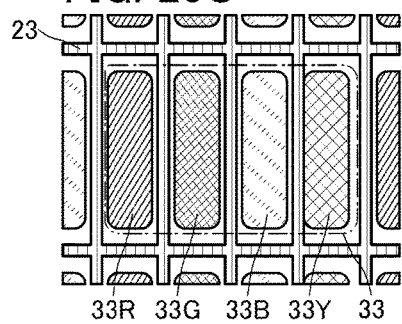
Figure 20D:
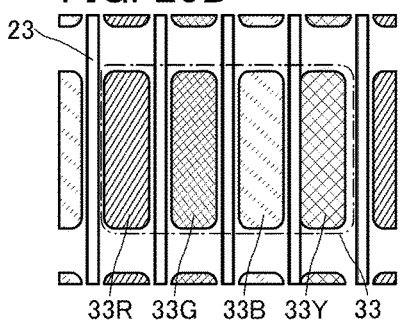

FIGS. 20C and 20D each show an example where the pixel 33 further includes a sub-pixel 33Y in the structure shown in FIGS. 20A and 20B. For example, a pixel capable of expressing yellow color can be used for the sub-pixel 33Y.

Instead of the sub-pixel 33Y, a pixel capable of expressing white color may be used. When the pixel 33 includes sub-pixels of more than three colors, power consumption can be reduced.

Figure 20E:
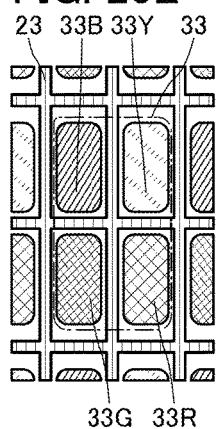

In the examples shown in FIGS. 20A to 20D, sub-pixels of each color are arranged in a stripe pattern. Alternatively, as shown in FIG. 20E, sub-pixels of two colors may be alternated in one direction, for example.

Furthermore, the sub-pixels included in the pixel 33 may differ in size (e.g., the area of a region contributing to display). For example, the size of the sub-pixel of blue color with a relatively low luminosity factor can be set large, whereas the size of the sub-pixel of green or red color with a relatively high luminosity factor can be set small.

Figure 20F:
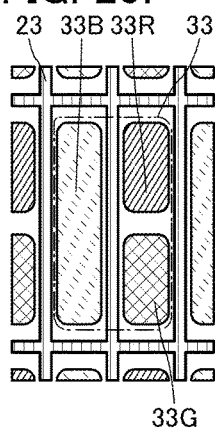
Figure 20G:
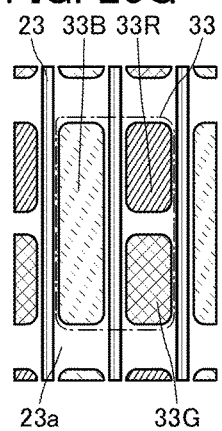

FIGS. 20F and 20G each show an example where the size of the sub-pixel 33B is larger than the size of the sub-pixel 33R and the size of the sub-pixel 33G. In the examples shown here, the sub-pixel 33R and the sub-pixel 33G are alternated. However, sub-pixels of each color may be arranged in a stripe pattern as shown in FIG. 20A and other drawings, and may have different sizes from each other.

Note that although the positional relationship between the conductive layer 23 and the sub-pixels is described here, the same applies to the conductive layer 24 and the conductive layer 25. That is, in the touch panel of one embodiment of the present invention, the opening 23a in the conductive layer 23 overlaps with one or more sub-pixels in a region and the opening 24a in the conductive layer 24 overlaps with one or more of the other sub-pixels in a region. Since each sub-pixel includes the display element as described above, it can be said that the opening 23a and the opening 24a each have a region overlapping with one or more display elements.

At least part of this embodiment can be implemented in combination with any of the embodiments described in this specification as appropriate.

Embodiment 2

In this embodiment, examples of a driving method of an input device or an input/output device of one embodiment of the present invention are described with reference to drawings.

[Example of Sensing Method of Sensor]

Figure 21A:
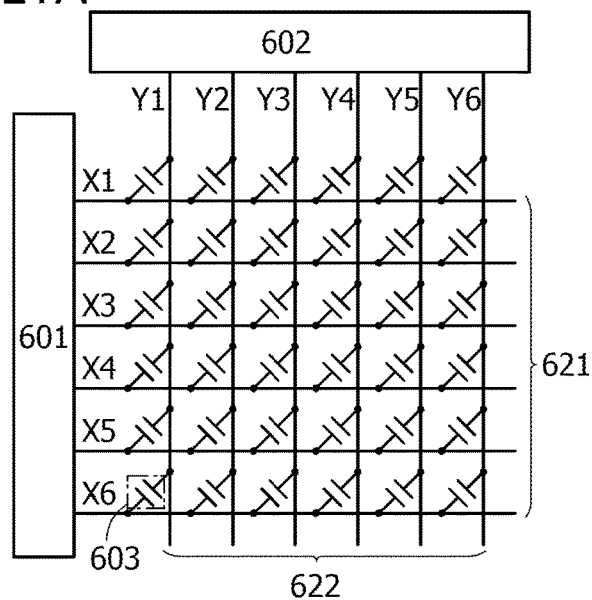
FIGS. 21A and 21B are a block diagram and a timing chart of a touch sensor of an embodiment.

FIG. 21A is a block diagram illustrating the structure of a mutual capacitive touch sensor. FIG. 21A illustrates a pulse voltage output circuit 601 and a current sensing circuit 602. Note that in FIG. 21A, six wirings X1 to X6 represent electrodes 621 to which a pulse voltage is applied, and six wirings Y1 to Y6 represent electrodes 622 that sense changes in current. FIG. 21A also illustrates a capacitor 603 that is formed where electrodes 621 and 622 overlap with each other. Note that functional replacement between the electrodes 621 and 622 is possible.

The pulse voltage output circuit 601 is a circuit for sequentially applying a pulse voltage to the wirings X1 to X6. By application of a pulse voltage to the wirings X1 to X6, an electric field is generated between the electrodes 621 and 622 of the capacitor 603. When the electric field between the electrodes is shielded, for example, a change occurs in mutual capacitance of the capacitor 603. The approach or contact of an object can be sensed by utilizing this change.

The current sensing circuit 602 is a circuit for sensing changes in current flowing through the wirings Y1 to Y6 that are caused by the change in capacitance in the capacitor 603. No change in current value is sensed in the wirings Y1 to Y6 when there is no approach or contact of an object, whereas a decrease in current value is sensed when capacitance is decreased owing to the approach or contact of an object. Note that an integrator circuit or the like is used for sensing of current values.

Figure 21B:
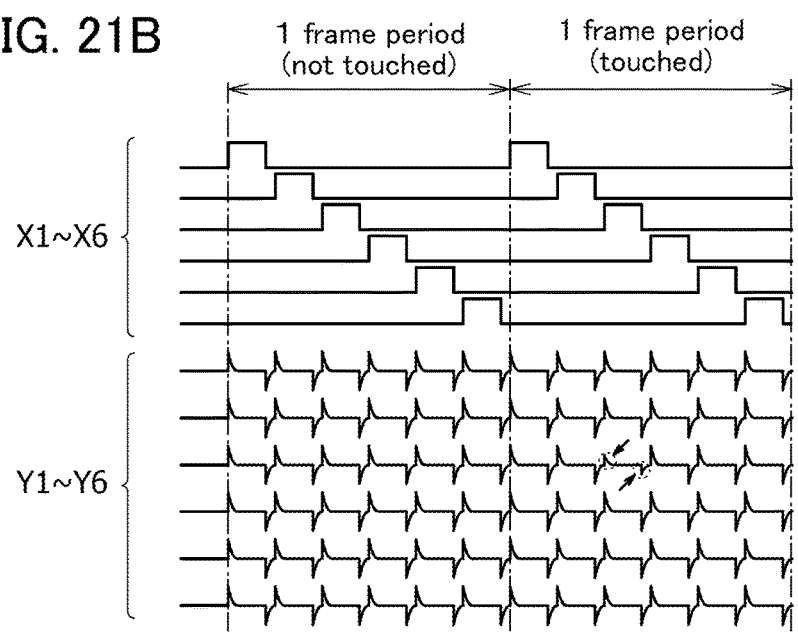

FIG. 21B is a timing chart showing input and output waveforms in the mutual capacitive touch sensor illustrated in FIG. 21A. In FIG. 21B, detection of an object is performed in all the rows and columns in one frame period. FIG. 21B shows a period when an object is not detected (not touched) and a period when an object is detected (touched). Sensed current values of the wirings Y1 to Y6 are shown as waveforms of voltage values.

A pulse voltage is sequentially applied to the wirings X1 to X6, and waveforms of the wirings Y1 to Y6 change in accordance with the pulse voltage. When there is no proximity or contact of an object, the waveforms of the wirings Y1 to Y6 change in accordance with changes in the voltages of the wirings X1 to X6. The current value is decreased at the point of approach or contact of the object and accordingly the waveform of the voltage value changes.

By sensing a change in mutual capacitance in this manner, proximity or contact of an object can be sensed.

It is preferable that the pulse voltage output circuit 601 and the current sensing circuit 602 be mounted on a substrate in a housing of an electronic appliance or on the touch panel in the form of an IC. In the case where the touch panel has flexibility, parasitic capacitance might be increased in a bent portion of the touch panel, and the influence of noise might be increased. In view of this, it is preferable to use an IC to which a driving method less influenced by noise is applied. For example, it is preferable to use an IC to which a driving method capable of increasing a signal-noise ratio (S/N ratio) is applied.

Figure 22:
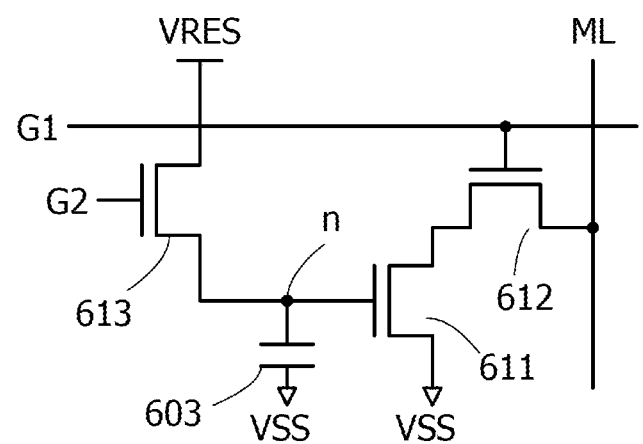
FIG. 22 is a circuit diagram of a touch sensor of an embodiment.

Although FIG. 21A is a passive matrix type touch sensor in which only the capacitor 603 is provided at the intersection portion of wirings as a touch sensor, an active matrix type touch sensor including a transistor and a capacitor may be used. FIG. 22 is a sensor circuit included in an active matrix type touch sensor.

The sensor circuit includes the capacitor 603 and transistors 611, 612, and 613. A signal G2 is input to a gate of the transistor 613. A voltage VRES is applied to one of a source and a drain of the transistor 613, and one electrode of the capacitor 603 and a gate of the transistor 611 are electrically connected to the other of the source and the drain of the transistor 613. One of a source and a drain of the transistor 611 is electrically connected to one of a source and a drain of the transistor 612, and a voltage VSS is applied to the other of the source and the drain of the transistor 611. A signal G1 is input to a gate of the transistor 612, and a wiring ML is electrically connected to the other of the source and the drain of the transistor 612. The voltage VSS is applied to the other electrode of the capacitor 603.

Next, the operation of the sensor circuit will be described. First, a potential for turning on the transistor 613 is supplied as the signal G2, and a potential with respect to the voltage VRES is thus applied to the node n connected to the gate of the transistor 611. Then, a potential for turning off the transistor 613 is applied as the signal G2, whereby the potential of the node n is maintained.

Then, capacitance of the capacitor 603 changes owing to the approach or contact of an object such as a finger, and accordingly the potential of the node n is changed from VRES.

In reading operation, a potential for turning on the transistor 612 is supplied as the signal G1. A current flowing through the transistor 611, that is, a current flowing through the wiring ML is changed in accordance with the potential of the node n. By sensing this current, the approach or contact of an object can be detected.

It is preferable that the transistors 611, 612, and 613 each include an oxide semiconductor in a semiconductor layer where a channel is formed. In particular, such a transistor is preferably used as the transistor 613 so that the potential of the node n can be held for a long time and the frequency of operation of resupplying VRES to the node n (refresh operation) can be reduced.

[Structure Example of In-Cell Touch Panel]

Although the examples where the electrodes in the touch sensor are formed over a substrate different from a substrate where the display element and the like are provided are described above, one or both of the pair of electrodes in the touch sensor may be formed over the substrate where the display element and the like are provided.

A structure example of a touch panel incorporating the touch sensor into a display portion including a plurality of pixels is described below. Here, an example where a liquid crystal element is used as a display element provided in the pixel is shown.

Figure 23A:
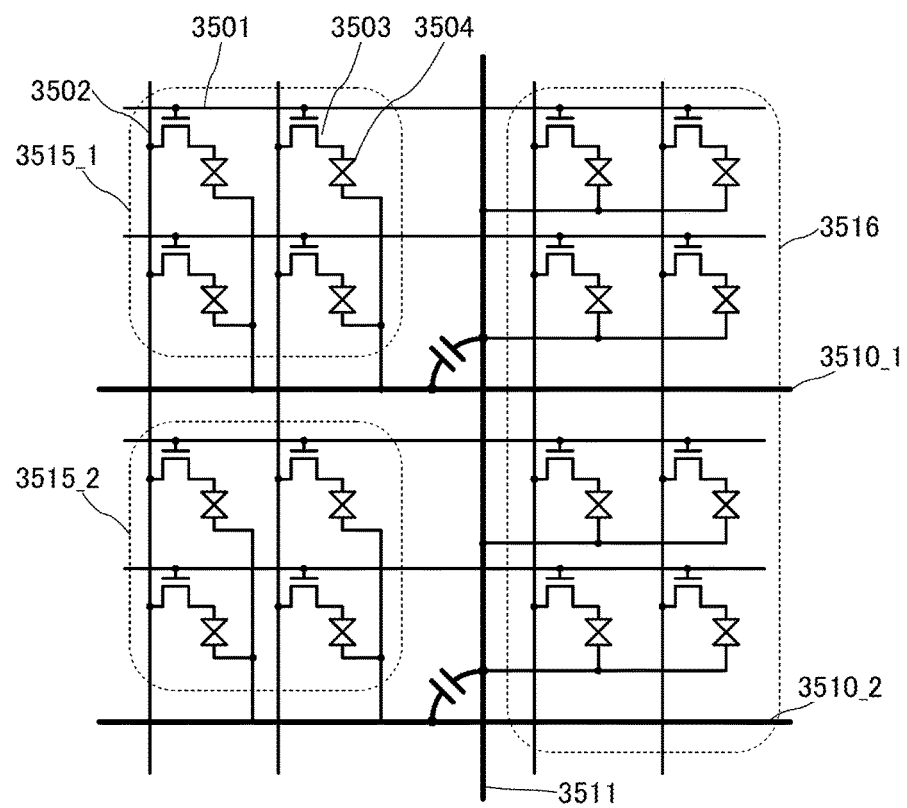
FIGS. 23A and 23B each illustrate a pixel provided with a touch sensor of an embodiment.

FIG. 23A is an equivalent circuit diagram of part of a pixel circuit provided in the display portion of the touch panel in this structure example.

Each pixel includes at least a transistor 3503 and a liquid crystal element 3504. In addition, a gate of the transistor 3503 is electrically connected to a wiring 3501, and one of a source and a drain of the transistor 3503 is electrically connected to a wiring 3502.

The pixel circuit includes a plurality of wirings extending in the X direction (e.g., a wiring 3510_1 and a wiring 3510_2) and a plurality of wirings extending in the Y direction (e.g., a wiring 3511). These wirings are provided to intersect with each other, and capacitance is formed therebetween.

Among the pixels provided in the pixel circuit, electrodes on one side of the liquid crystal elements of some pixels adjacent to each other are electrically connected to each other to form one block. The block is classified into two types: an island-shaped block (e.g., a block 3515_1 or a block 3515_2) and a linear block (e.g., a block 3516) extending in the Y direction. Note that only part of the pixel circuit is illustrated in FIGS. 23A and 23B, but actually, these two kinds of blocks are repeatedly arranged in the X direction and the Y direction.

The wiring 3510_1 (or 3510_2) extending in the X direction is electrically connected to the island-shaped block 3515_1 (or the block 3515_2). Although not illustrated, the wiring 3510_1 extending in the X direction is electrically connected to a plurality of island-shaped blocks 3515_1 which are provided discontinuously along the X direction with the linear blocks therebetween. Furthermore, the wiring 3511 extending in the Y direction is electrically connected to the linear block 3516.

Figure 23B:
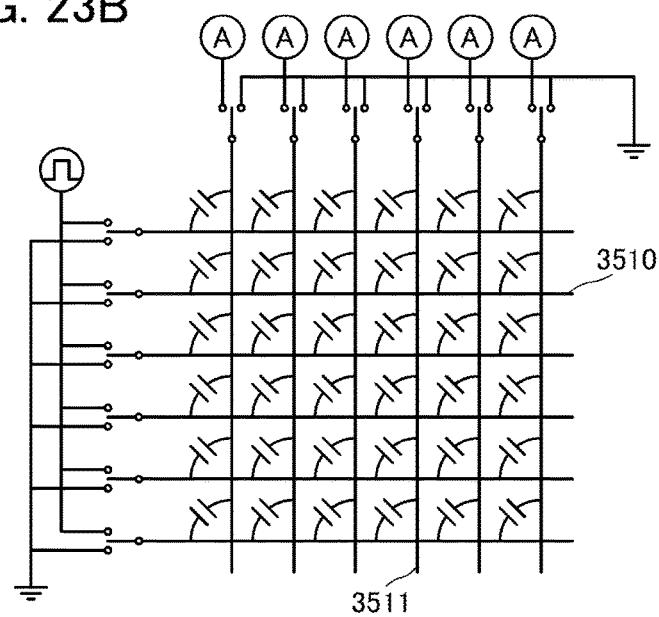

FIG. 23B is an equivalent circuit diagram illustrating the connection between a plurality of wirings 3510 extending in the X direction and the plurality of wirings 3511 extending in the Y direction. An input voltage or a common potential can be input to each of the wirings 3510 extending in the X direction. Furthermore, a ground potential can be input to each of the wirings 3511 extending in the Y direction, or the wirings 3511 can be electrically connected to the sensing circuit.

Operation of the above-described touch panel is described with reference to FIGS. 24A and 24B.

Here, one frame period is divided into a writing period and a sensing period. The writing period is a period in which image data is written to a pixel, and the wirings 3501 (also referred to as gate lines or scan lines) illustrated in FIG. 23A are sequentially selected. On the other hand, the sensing period is a period in which sensing is performed by a touch sensor, and the wirings 3510 extending in the X direction are sequentially selected and an input voltage is input.

Figure 24A:
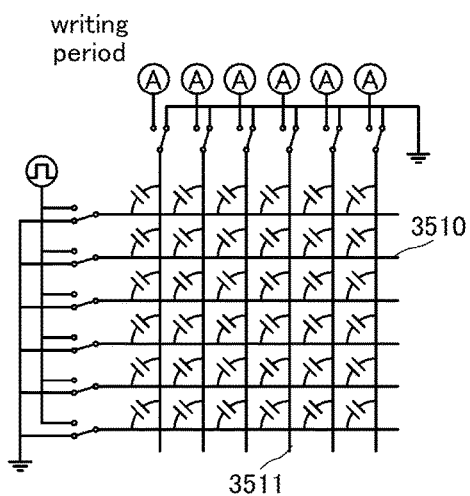
FIGS. 24A and 24B illustrate operation of a touch sensor and a pixel of an embodiment.

FIG. 24A is an equivalent circuit diagram in the writing period. In the writing period, a common potential is input to both the wiring 3510 extending in the X direction and the wiring 3511 extending in the Y direction.

Figure 24B:
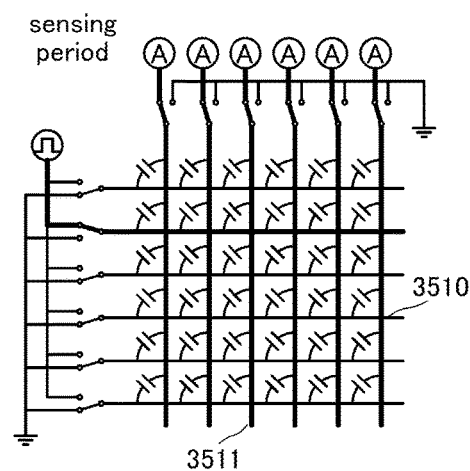

FIG. 24B is an equivalent circuit diagram at a certain point of time in the sensing period. In the sensing period, each of the wirings 3511 extending in the Y direction is electrically connected to the sensing circuit. An input voltage is input to the wirings 3510 extending in the X direction which are selected, and a common potential is input to the wirings 3510 extending in the X direction which are not selected.

Note that the driving method described here can be applied to not only an in-cell touch panel but also the above-described touch panels, and can be used in combination with the method described in the driving method example.

It is preferable that a period in which an image is written and a period in which sensing is performed by a touch sensor be separately provided as described above. Thus, a decrease in sensitivity of the touch sensor caused by noise generated when data is written to a pixel can be suppressed.

At least part of this embodiment can be implemented in combination with any of the other embodiments described in this specification as appropriate.

Embodiment 3

In this embodiment, a display module and electronic devices that include the display device of one embodiment of the present invention or a display system will be described with reference to FIG. 25 and FIGS. 26A to 26H.

Figure 25:
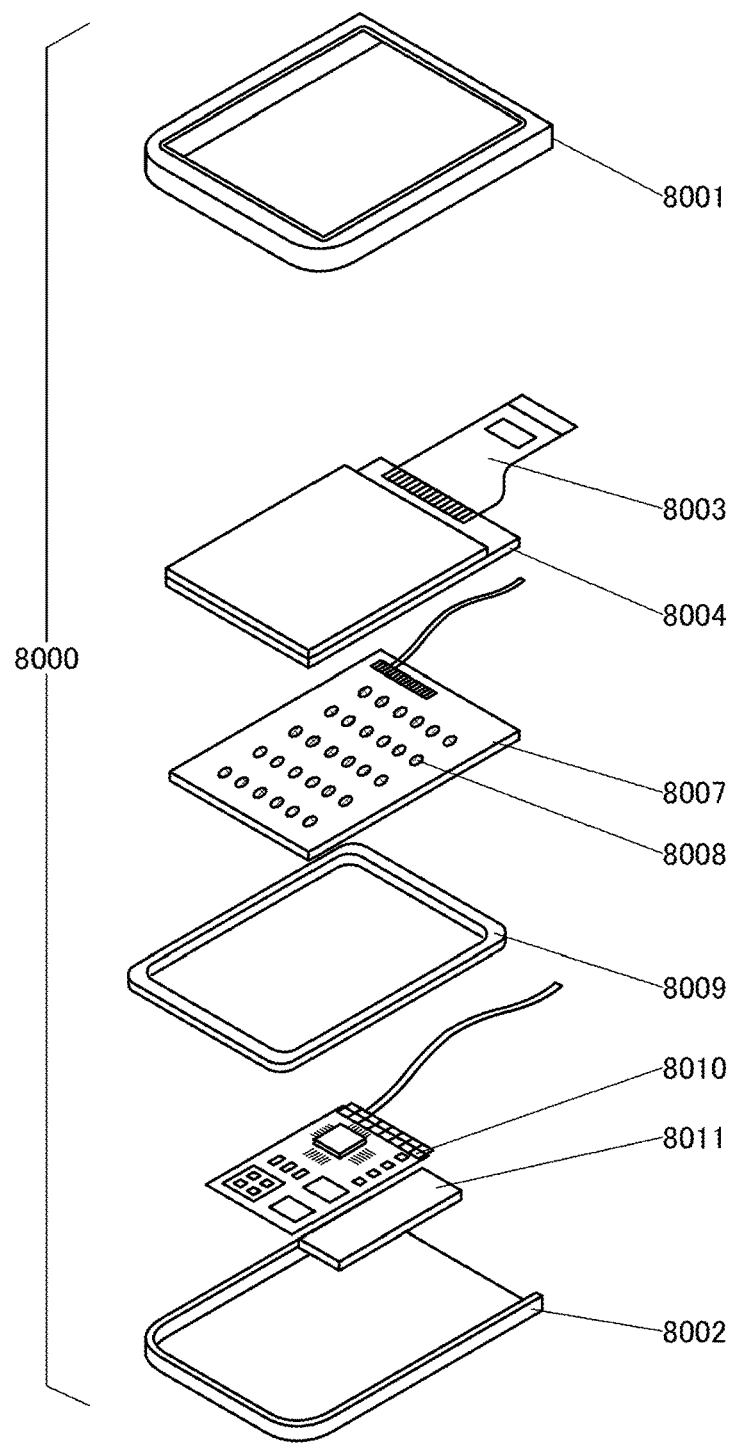
FIG. 25 illustrates a display module of an embodiment.

In a display module 8000 illustrated in FIG. 25, a touch panel 8004 connected to an FPC 8003, a frame 8009, a printed board 8010, and a battery 8011 are provided between an upper cover 8001 and a lower cover 8002.

The touch panel module of one embodiment of the present invention can be used for, for example, the touch panel 8004.

The shapes and sizes of the upper cover 8001 and the lower cover 8002 can be changed as appropriate in accordance with the size of the touch panel 8004.

The touch panel 8004 can be a resistive touch panel or a capacitive touch panel and may be formed so as to overlap with a display panel. Alternatively, a counter substrate (sealing substrate) of the touch panel 8004 can have a touch panel function. Further alternatively, a photosensor may be provided in each pixel of the touch panel 8004 to form an optical touch panel.

In the case of a transmissive liquid crystal element, a backlight 8007 may be provided as illustrated in FIG. 25. The backlight 8007 includes a light source 8008. Although the light source 8008 is provided over the backlight 8007 in FIG. 25, one embodiment of the present invention is not limited to this structure. For example, a structure in which the light source 8008 is provided at an end portion of the backlight 8007 and a light diffusion plate is further provided may be employed. Note that the backlight 8007 need not be provided in the case where a self-luminous light-emitting element such as an organic EL element is used or in the case where a reflective panel or the like is employed.

The frame 8009 protects the display panel 8006 and functions as an electromagnetic shield for blocking electromagnetic waves generated by the operation of the printed board 8010. The frame 8009 can also function as a radiator plate.

The printed board 8010 is provided with a power supply circuit and a signal processing circuit for outputting a video signal and a clock signal. As a power source for supplying power to the power supply circuit, an external commercial power source or a power source using the battery 8011 provided separately may be used. The battery 8011 can be omitted in the case of using a commercial power source.

The touch panel 8004 may be additionally provided with a component such as a polarizing plate, a retardation plate, or a prism sheet.

FIGS. 26A to 26H illustrate electronic devices. These electronic devices can include a housing 5000, a display portion 5001, a speaker 5003, an LED lamp 5004, operation keys 5005 (including a power switch or an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone 5008, and the like.

Figure 26A:
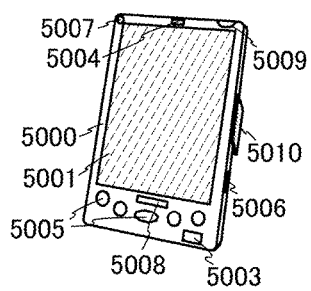
FIGS. 26A to 26H each illustrate an electronic device of an embodiment.
Figure 26B:
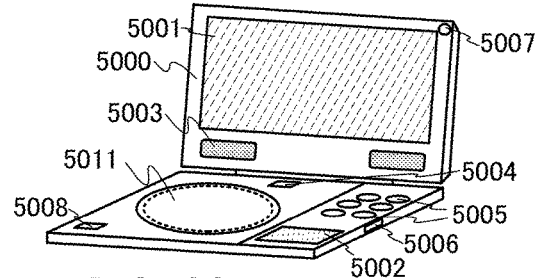
Figure 26C:
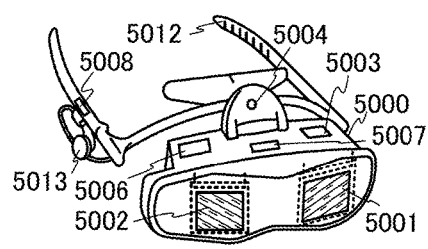
Figure 26D:
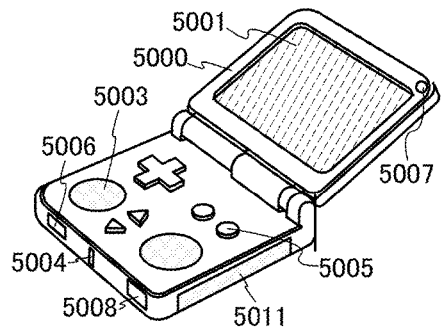
Figure 26E:
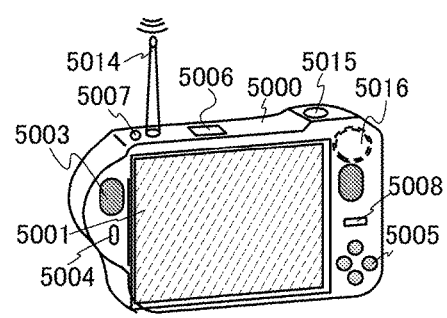
Figure 26F:
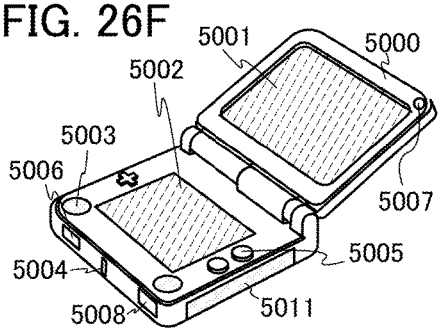
Figure 26G:
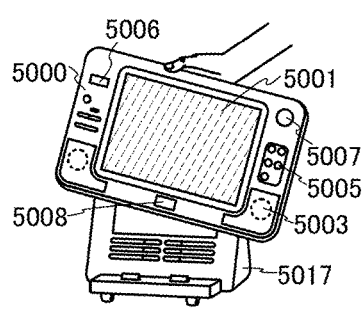
Figure 26H:
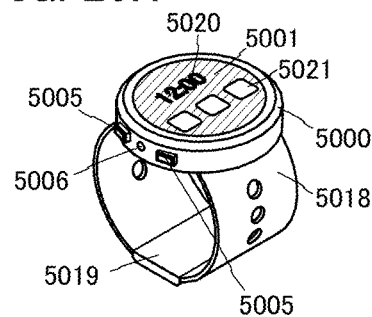

FIG. 26A illustrates a mobile computer, which can include a switch 5009, an infrared port 5010, and the like in addition to the above components. FIG. 26B illustrates a portable image reproducing device provided with a recording medium (e.g., a DVD reproducing device), which can include a second display portion 5002, a recording medium read portion 5011, and the like in addition to the above components. FIG. 26C illustrates a goggle-type display, which can include the second display portion 5002, a support 5012, an earphone 5013, and the like in addition to the above components. FIG. 26D illustrates a portable game machine, which can include the recording medium read portion 5011 and the like in addition to the above components. FIG. 26E illustrates a digital camera which has a television reception function and can include an antenna 5014, a shutter button 5015, an imaging portion 5016, and the like in addition to the above components. FIG. 26F illustrates a portable game machine, which can include the second display portion 5002, the recording medium read portion 5011, and the like in addition to the above components. FIG. 26G illustrates a portable television receiver, which can include a charger 5017 capable of transmitting and receiving signals, and the like in addition to the above components. FIG. 26H illustrates a wrist-watch-type information terminal, which can include a band 5018, a clasp 5019, and the like in addition to the above components. The display portion 5001 mounted in the housing 5000 serving as a bezel includes a non-rectangular display region. The display portion 5001 can display an icon 5020 indicating time, another icon 5021, and the like.

The electronic devices illustrated in FIGS. 26A to 26H can have a variety of functions, for example, a function of displaying a variety of information (e.g., a still image, a moving image, and a text image) on a display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading a program or data stored in a recording medium and displaying the program or data on a display portion. Furthermore, the electronic device including a plurality of display portions can have a function of displaying image information mainly on one display portion while displaying text information mainly on another display portion, a function of displaying a three-dimensional image by displaying images where parallax is considered on a plurality of display portions, or the like. Furthermore, the electronic device including an imaging portion can have a function of photographing a still image, a function of photographing a moving image, a function of automatically or manually correcting a photographed image, a function of storing a photographed image in a recording medium (an external recording medium or a recording medium incorporated in a camera), a function of displaying a photographed image on the display portion, or the like. Note that functions that can be provided for the electronic devices illustrated in FIGS. 26A to 26H are not limited to the above, and the electronic devices can have a variety of functions.

The electronic devices described in this embodiment are characterized by including a display portion for displaying some sort of information. The display device described in the above embodiment can be employed for the display portion.

At least part of this embodiment can be implemented in combination with any of the other embodiments described in this specification as appropriate.

EXPLANATION OF REFERENCE

10: touch panel module, 11: capacitor, 21: substrate, 22: touch sensor, 22a: opening, 23a: opening, 24a: opening, 23: conductive layer, 24: conductive layer, 25: conductive layer, 26: conductive layer, 27: conductive layer, 29: wiring, 31: substrate, 32: display portion, 33: pixel, 33B: sub-pixel, 33G: sub-pixel, 33R: sub-pixel, 33Y: sub-pixel, 34: circuit, 35: wiring, 41: FPC, 42: FPC, 60: display element, 101: connection portion, 115: light-blocking layer, 121: insulating layer, 122: insulating layer, 123: insulating layer, 124: spacer, 126: insulating layer, 127: insulating layer, 131B: coloring layer, 131R: coloring layer, 141: adhesive layer, 151: conductive layer, 152: liquid crystal, 153: conductive layer, 201: transistor, 202: transistor, 203: capacitor, 204: connection portion, 211: insulating layer, 212: insulating layer, 213: insulating layer, 214: insulating layer, 215: insulating layer, 221: conductive layer, 222: conductive layer, 223: conductive layer, 231: semiconductor layer, 241: connection layer, 242: connection layer, 300: buffer layer, 301: transistor, 302: transistor, 601: pulse voltage output circuit, 602: current sensing circuit, 603: capacitor, 611: transistor, 612: transistor, 613: transistor, 621: electrode, 622: electrode, 3501: wiring, 3502: wiring, 3503: transistor, 3504: liquid crystal element, 3510: wiring, 3510_1: wiring, 3510_2: wiring, 3511: wiring, 3515_1: block, 3515_2: block, 3516: block, 5000: housing, 5001: display portion, 5002: display portion, 5003: speaker, 5004: LED lamp, 5005: operation key, 5006: connection terminal, 5007: sensor, 5008: microphone, 5009: switch, 5010: infrared port, 5011: recording medium read portion, 5012: support, 5013: earphone, 5014: antenna, 5015: shutter button, 5016: imaging portion, 5017: charger, 5018: band, 5019: clasp, 5020: icon, 5021: icon, 8000: display module, 8001: upper cover, 8002: lower cover, 8003: FPC, 8004: touch panel, 8006:

display panel, 8007: backlight, 8008: light source, 8009: frame, 8010: printed board, and 8011: battery.

This application is based on Japanese Patent Application serial no. 2015-053661 filed with Japan Patent Office on Mar. 17, 2015 and Japanese Patent Application serial no. 2015-053765 filed with Japan Patent Office on Mar. 17, 2015, the entire contents of which are hereby incorporated by reference.

The invention claimed is:

1. A touch panel comprising:
a first substrate;
a second substrate which faces the first substrate;
a first conductive layer;
a second conductive layer;
a third conductive layer;
a fourth conductive layer;
a fifth conductive layer;
a first insulating layer;
a first pixel; and
a second pixel adjacent to the first pixel,
wherein the first conductive layer, the second conductive layer, and the third conductive layer are apart from each other on a same plane between the first substrate and the second substrate,
wherein the second conductive layer is between the first conductive layer and the third conductive layer in a plan view,
wherein the first conductive layer and the fourth conductive layer are electrically connected to each other,
wherein the third conductive layer and the fourth conductive layer are electrically connected to each other,
wherein the second conductive layer and the fourth conductive layer overlap with each other with the first insulating layer therebetween,
wherein the second conductive layer is between the fourth conductive layer and the second substrate,
wherein the first conductive layer has a mesh shape comprising a first opening and a second opening adjacent to the first opening,
wherein the first opening of the mesh shape, a first pixel electrode in the first pixel, and the fifth conductive layer overlap with one another,
wherein the second opening of the mesh shape, a second pixel electrode in the second pixel, and the fifth conductive layer overlap with one another,
wherein the fifth conductive layer is between the first conductive layer and the first substrate, and
wherein the fifth conductive layer is configured to transmit visible light.

2. The touch panel according to claim 1, wherein the fifth conductive layer comprises metal oxide.

3. The touch panel according to claim 1, wherein the fourth conductive layer and the fifth conductive layer are formed by processing a same film.

4. The touch panel according to claim 1, further comprising liquid crystal over the first pixel electrode.

5. The touch panel according to claim 1,
wherein the first pixel comprises a first coloring layer,
wherein the second pixel comprises a second coloring layer,
wherein the first coloring layer, the first opening of the mesh shape, the first pixel electrode and the fifth conductive layer overlap with one another, and
wherein the second coloring layer, the second opening of the mesh shape, the second pixel electrode and the fifth conductive layer overlap with one another.

6. The touch panel according to claim 1, wherein the fifth conductive layer is electrically connected to a terminal supplied with a constant potential.

7. The touch panel according to claim 1,
wherein a second insulating layer is provided between the second substrate and the first insulating layer,
wherein the first conductive layer, the second conductive layer, and the third conductive layer are on and in direct contact with the second insulating layer.

8. The touch panel according to claim 1, further comprising a transistor electrically connected to the first pixel electrode,
wherein the transistor comprises a semiconductor layer, and
wherein the semiconductor layer and the fifth conductive layer comprise oxides containing a same metal element.

9. The touch panel according to claim 8,
wherein the transistor comprises a first gate electrode and a second gate electrode,
wherein the semiconductor layer is between the first gate electrode and the second gate electrode, and
wherein one of the first gate electrode and the second gate electrode comprises an oxide containing the metal element.

10. The touch panel according to claim 7, further comprising a light-blocking layer,
wherein the light-blocking layer is provided between the second substrate and the second insulating layer.

11. A touch panel comprising:
a first substrate;
a second substrate which faces the first substrate;
a first conductive layer;
a second conductive layer;
a third conductive layer;
a fourth conductive layer;
a fifth conductive layer;
a first insulating layer;
a second insulating layer comprising silicon nitride over the first insulating layer;
a first pixel; and
a second pixel adjacent to the first pixel,
wherein the first conductive layer, the second conductive layer, and the third conductive layer are apart from each other on a same plane between the first substrate and the second substrate,
wherein the second conductive layer is between the first conductive layer and the third conductive layer in a plan view,
wherein the first conductive layer and the fourth conductive layer are electrically connected to each other,
wherein the third conductive layer and the fourth conductive layer are electrically connected to each other,
wherein the second conductive layer and the fourth conductive layer overlap with each other with the first insulating layer therebetween,
wherein the fourth conductive layer is between the first insulating layer and the second insulating layer,
wherein the second conductive layer is between the fourth conductive layer and the second substrate,
wherein the first conductive layer has a mesh shape comprising a first opening and a second opening adjacent to the first opening,
wherein the first opening of the mesh shape, a first pixel electrode in the first pixel, and the fifth conductive layer overlap with one another, wherein the second opening of the mesh shape, a second pixel electrode in the second pixel, and the fifth conductive layer overlap with one another, wherein the fifth conductive layer is between the first conductive layer and the first substrate, and wherein the fifth conductive layer is configured to transmit visible light.

12. The touch panel according to claim 11, wherein the fifth conductive layer comprises metal oxide.

13. The touch panel according to claim 11, wherein the fourth conductive layer and the fifth conductive layer are formed by processing a same film.

14. The touch panel according to claim 11, further comprising liquid crystal over the first pixel electrode.

15. The touch panel according to claim 11, wherein the first pixel comprises a first coloring layer, wherein the second pixel comprises a second coloring layer, wherein the first coloring layer, the first opening of the mesh shape, the first pixel electrode and the fifth conductive layer overlap with one another, and wherein the second coloring layer, the second opening of the mesh shape, the second pixel electrode and the fifth conductive layer overlap with one another.

16. The touch panel according to claim 11, wherein the fifth conductive layer is electrically connected to a terminal supplied with a constant potential.

17. The touch panel according to claim 11, wherein a third insulating layer is provided between the second substrate and the first insulating layer, wherein the first conductive layer, the second conductive layer, and the third conductive layer are on and in direct contact with the third insulating layer.

18. The touch panel according to claim 11, further comprising a transistor electrically connected to the first pixel electrode, wherein the transistor comprises a semiconductor layer, and wherein the semiconductor layer and the fifth conductive layer comprise oxide semiconductors containing a same metal.

19. The touch panel according to claim 18, wherein the transistor comprises a first gate electrode and a second gate electrode, wherein the semiconductor layer is between the first gate electrode and the second gate electrode, and wherein one of the first gate electrode and the second gate electrode comprises an oxide semiconductor containing the same metal as the semiconductor layer.

20. The touch panel according to claim 17, further comprising a light-blocking layer, wherein the light-blocking layer is provided between the second substrate and the third insulating layer.

* * * * *